United States Patent
Roh et al.

(10) Patent No.: US 12,523,410 B2
(45) Date of Patent: Jan. 13, 2026

(54) REFRIGERATOR

(71) Applicant: SAMSUNG ELECTRONICS CO., LTD., Suwon-si (KR)

(72) Inventors: Heeyuel Roh, Suwon-si (KR); Kookjeong Seo, Suwon-si (KR); Wonjae Yoon, Suwon-si (KR); Jeongmin Jeon, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 265 days.

(21) Appl. No.: 18/127,483

(22) Filed: Mar. 28, 2023

(65) Prior Publication Data

US 2023/0235941 A1 Jul. 27, 2023

Related U.S. Application Data

(63) Continuation of application No. PCT/KR2021/011825, filed on Sep. 2, 2021.

(30) Foreign Application Priority Data

Sep. 28, 2020 (KR) .................. 10-2020-0125455

(51) Int. Cl.
*F25D 11/02* (2006.01)
*F25D 17/04* (2006.01)
(Continued)

(52) U.S. Cl.
CPC ............ *F25D 17/045* (2013.01); *F25D 11/02* (2013.01); *F25D 17/062* (2013.01); *F25D 17/067* (2013.01); *F25D 17/08* (2013.01)

(58) Field of Classification Search
CPC ...... F25D 11/02; F25D 17/045; F25D 17/062; F25D 17/065; F25D 17/067; F25D 17/08; F25D 2317/067
See application file for complete search history.

(56) References Cited

U.S. PATENT DOCUMENTS 5,816,061 A 10/1998 Lee et al.
6,637,225 B1 10/2003 Cho et al.
(Continued)

FOREIGN PATENT DOCUMENTS

JP 4-306476 10/1992
JP 9-133448 5/1997
(Continued)

OTHER PUBLICATIONS

International Search Report dated Dec. 3, 2021 issued in PCT Application No. PCT/KR2021/011825.
(Continued)

*Primary Examiner* — Filip Zec
(74) *Attorney, Agent, or Firm* — STAAS & HALSEY LLP

(57) ABSTRACT

A refrigerator includes: a storage compartment; an evaporator configured to generate cold air through heat exchange; a duct comprising a channel formed therein and through which the generated cold air flows and a cold air outlet through which the cold air is discharged to the storage compartment; a fan configured to supply the generated cold air to the storage compartment through the channel; and a cold-air control unit provided in the channel and to control a discharging amount of cold air discharged through the cold air outlet. The cold-air control unit includes a damper movable according to strength of the generated cold air supplied by the fan to adjust the cold air outlet.

13 Claims, 27 Drawing Sheets

(51) Int. Cl.
    *F25D 17/06*     (2006.01)
    *F25D 17/08*     (2006.01)

(56) References Cited

U.S. PATENT DOCUMENTS

| | | | | |
|---|---|---|---|---|
| 9,784,465 | B2* | 10/2017 | Kumar | F24F 11/77 |
| 11,150,006 | B2* | 10/2021 | Guanye | F25D 19/003 |
| 11,371,768 | B2* | 6/2022 | Song | F25D 29/00 |
| 11,986,107 | B2* | 5/2024 | Paupardin | F25D 17/045 |
| 12,031,768 | B2* | 7/2024 | Lee | F25D 17/067 |
| 12,163,722 | B2* | 12/2024 | Lee | F25D 17/06 |
| 2008/0006043 | A1* | 1/2008 | Lee | F04D 25/064 |
| | | | | 62/186 |
| 2008/0148761 | A1* | 6/2008 | Venkatakrishnan | F25D 23/126 |
| | | | | 62/340 |
| 2010/0251692 | A1* | 10/2010 | Kinde, Sr. | F02K 7/16 |
| | | | | 60/767 |
| 2013/0000333 | A1 | 1/2013 | Kim et al. | |
| 2016/0169510 | A1* | 6/2016 | Pozarnsky | F28D 21/001 |
| | | | | 165/110 |
| 2016/0178265 | A1* | 6/2016 | Lee | F04D 25/08 |
| | | | | 417/423.15 |
| 2017/0082347 | A1 | 3/2017 | Lee | |
| 2017/0336132 | A1 | 11/2017 | Chang et al. | |
| 2018/0071425 | A1* | 3/2018 | Jin | A61L 9/125 |
| 2018/0180346 | A1 | 6/2018 | Shin | |
| 2018/0283765 | A1* | 10/2018 | Yi | F25D 17/065 |
| 2019/0056165 | A1* | 2/2019 | Im | F25D 17/062 |
| 2019/0162453 | A1 | 5/2019 | Oh | |
| 2019/0301786 | A1* | 10/2019 | Lee | F25D 17/08 |
| 2022/0159796 | A1* | 5/2022 | Feng | H05B 6/6414 |

FOREIGN PATENT DOCUMENTS

| | | |
|---|---|---|
| JP | 2004-61093 | 2/2004 |
| KR | 20-1999-0018101 | 6/1999 |
| KR | 2000-0028477 | 5/2000 |
| KR | 2002-0057705 | 7/2002 |
| KR | 20-0309846 | 4/2003 |
| KR | 10-2003-0065943 | 8/2003 |
| KR | 10-2006-0110150 | 10/2006 |
| KR | 10-2007-0074220 | 7/2007 |
| KR | 10-2011-0092967 | 8/2011 |
| KR | 10-2011-0098413 | 9/2011 |
| KR | 10-2017-0014564 | 2/2017 |
| KR | 10-2017-0034713 | 3/2017 |
| KR | 10-2017-0081463 | 7/2017 |
| KR | 10-2018-0073301 | 7/2018 |
| KR | 10-2019-0062930 | 6/2019 |

OTHER PUBLICATIONS

Written Opinion dated Dec. 3, 2021 issued in PCT Application No. PCT/KR2021/011825.
Office Action dated Sep. 22, 2025 issued in Korean Application No. 10-2020-0125455.

* cited by examiner

REFRIGERATOR

CROSS-REFERENCE TO RELATED APPLICATIONS

This application is a continuation application, under 35 U.S.C. § 111(a), of International Patent Application No. PCT/KR2021/011825, filed on Sep. 2, 2021, which claims the priority benefit of Korean Patent Application No. 10-2020-0125455, filed on Sep. 28, 2020 in the Korean Patent and Trademark Office, the disclosures of which are hereby incorporated by reference in their entirety.

BACKGROUND

Field

The disclosure relates to a refrigerator having a function of switching a freezer compartment into a refrigerator compartment.

Description of the Related Art

In a mono-cycle type refrigerator that employs a single evaporator to cool both an upper freezer compartment and a lower refrigerator compartment, cold air passed through the evaporator located behind the freezer compartment is circulated along a channel by a blower fan. A certain amount of cold air passed through the blower fan is distributed to the freezer compartment through a freezer compartment discharging port provided in a duct disposed in front of the evaporator, and the remaining amount goes down to the refrigerator compartment and is discharged to a refrigerator compartment is charging port. The cold air sucked after cooling the freezer compartment and the cold air sucked after cooling the refrigerator compartment are mixed under the evaporator, and then such mixed air passes the evaporator again and undergoes a cooling and circulating mechanism.

When a user does not need the freezer compartment but needs only the refrigerator compartment, it is necessary to switch the freezer compartment to the refrigerator compartment. To this end, a related art has been proposed to adjust the amount of cold air by controlling an opening degree of a cold air discharging port of the freezer compartment through a rotary damper.

However, such a related art has problems in that only switching to a freezing mode or a refrigerating mode is possible without an off function, and temperature is not quickly lowered when high-temperature air is introduced into the freezer compartment in the refrigerating mode.

SUMMARY

According to an embodiment of the disclosure, a refrigerator including: a storage compartment; an evaporator configured to generate cold air through heat exchange; a duct including a channel formed therein and through which the generated cold air moves and a cold air outlet through which the cold air is discharged to the storage compartment; a fan configured to supply the generated cold air to the storage compartment through the channel; and a cold-air control unit provided in the channel and configured to control a discharging amount of cold air discharged through the cold air outlet, the cold-air control unit including a damper movable according to strength of the generated cold air supplied by the fan to adjust the cold air outlet.

The storage compartment may include a first storage compartment and a second storage compartment, and the cold-air control unit is configured to adjust the discharging amount of the generated cold air to the first storage compartment according to a selected mode of the refrigerator.

The cold-air control unit may include a housing including a variable channel to accommodate the damper to be movable therein and to communicate with the channel.

The variable channel may include a damper evacuating portion, the damper evacuating portion having an upper inner wall formed therein and is extended along a flowing direction of the generated cold air in the variable channel.

A gap between the damper and the inner wall of the variable channel may increase as the damper moves to the damper evacuating portion.

The damper may have a cylindrical shape.

The damper may be disposed transversely to an extended direction of the variable channel, and the variable channel may include a damper guide to support opposite ends of the damper and to guide the damper to move to the damper evacuating portion.

The cold-air control unit may include a stopper to prevent the damper from moving in the variable channel.

The refrigerator damper may include a leaf spring elastically transformable along a flowing direction of the cold air.

The cold-air control unit may operate in a freezing mode where a cold air discharging port is fully open, a refrigerating mode where the cold air discharging port is partially open, and an off mode where the cold air discharging port is blocked.

The cold-air control unit may be exposed to an inside of the storage compartment, the cold-air control unit may include a knob to select the freezing mode, the refrigerating mode, and the off mode.

The channel may include a connection channel to supply the cold air to the second storage compartment.

The cold-air control unit may include a first cold-air control unit, and the refrigerator further comprises a second cold-air control unit may be provided in the connection channel.

The second cold-air control unit may be exposed to an inside of the storage compartment, the second cold-air control unit may include a second knob to control the amount of cold air flowing in the connection channel.

BRIEF DESCRIPTION OF DRAWINGS

Other aspects, features and advantages of the disclosure will become more apparent from the following detailed description, taken in conjunction with the accompanying drawings.

DETAILED DESCRIPTION

Figure 1:
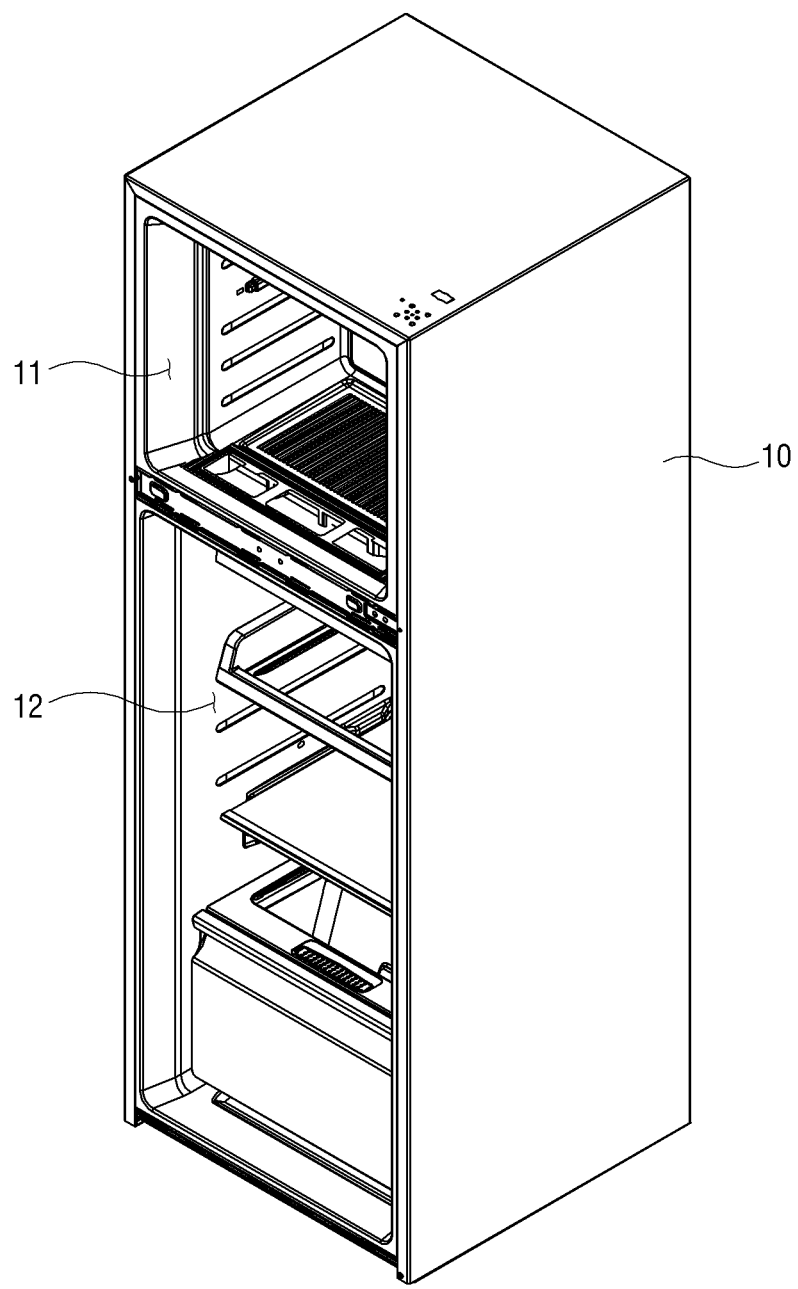
FIG. 1 is a view schematically showing a refrigerator according to an embodiment.

Below, embodiments of the disclosure will be described in detail with reference to the accompanying drawings. In the drawings, like numerals or symbols refer to like elements having substantially the same function, and the size of each element may be exaggerated for clarity and convenience of description. However, the technical spirit of the disclosure and its configurations and operations are not limited to the configurations or operations to be described in the following embodiments. In the following descriptions, details about publicly known functions or features will be omitted if it is identified that they cloud the gist of the disclosure.

In the disclosure, terms "have", "may have", "include", "may include", etc. indicate the presence of corresponding features (e.g., a numeral value, a function, an operation, or an element such as a part, etc.), and do not exclude the presence of additional features.

In the disclosure, terms "A or B", "at least one of A or/and B", "one or more of A or/and B" or the like may include all possible combinations of elements enumerated together. For example, "A or B", "at least one of A and B", "at least one of A or B" may refer to all of the cases of (1) including at least one A, (2) including at least one B, or (3) including all of at least one A and at least one B.

In the disclosure, terms "first", "second", etc. are used only to distinguish one element from another, and singular forms are intended to include plural forms unless otherwise mentioned contextually.

In addition, in the disclosure, terms "upper", "lower", "left", "right", "inside", "outside", "inner", "outer", "front", "rear", etc. are defined with respect to the accompanying drawings, and do not restrict the shape or location of the elements.

In the disclosure, the expression of "configured to (or set to)" may for example be replaced with "suitable for," "having the capacity to," "designed to," "adapted to," "made to," or "capable of" according to circumstances. Also, the expression of "configured to (or set to)" may not necessarily refer to only "specifically designed to" in terms of hardware. Instead, the "device configured to" may refer to "capable of" along with other devices or parts in a certain circumstance.

The disclosure is to provide a refrigerator of which a freezer compartment is switchable to a refrigerator compartment.

As described above, in a refrigerator according to an embodiment of the disclosure, a freezer compartment is switchable to a refrigerator compartment or the refrigerator compartment is switchable to the freezer compartment as desired by a user. In this case, the user may not only efficiently cope with a sudden change in temperature in the freezer compartment switched to the refrigerator compartment but also be provided with an off function to block cold air.

Figure 2:
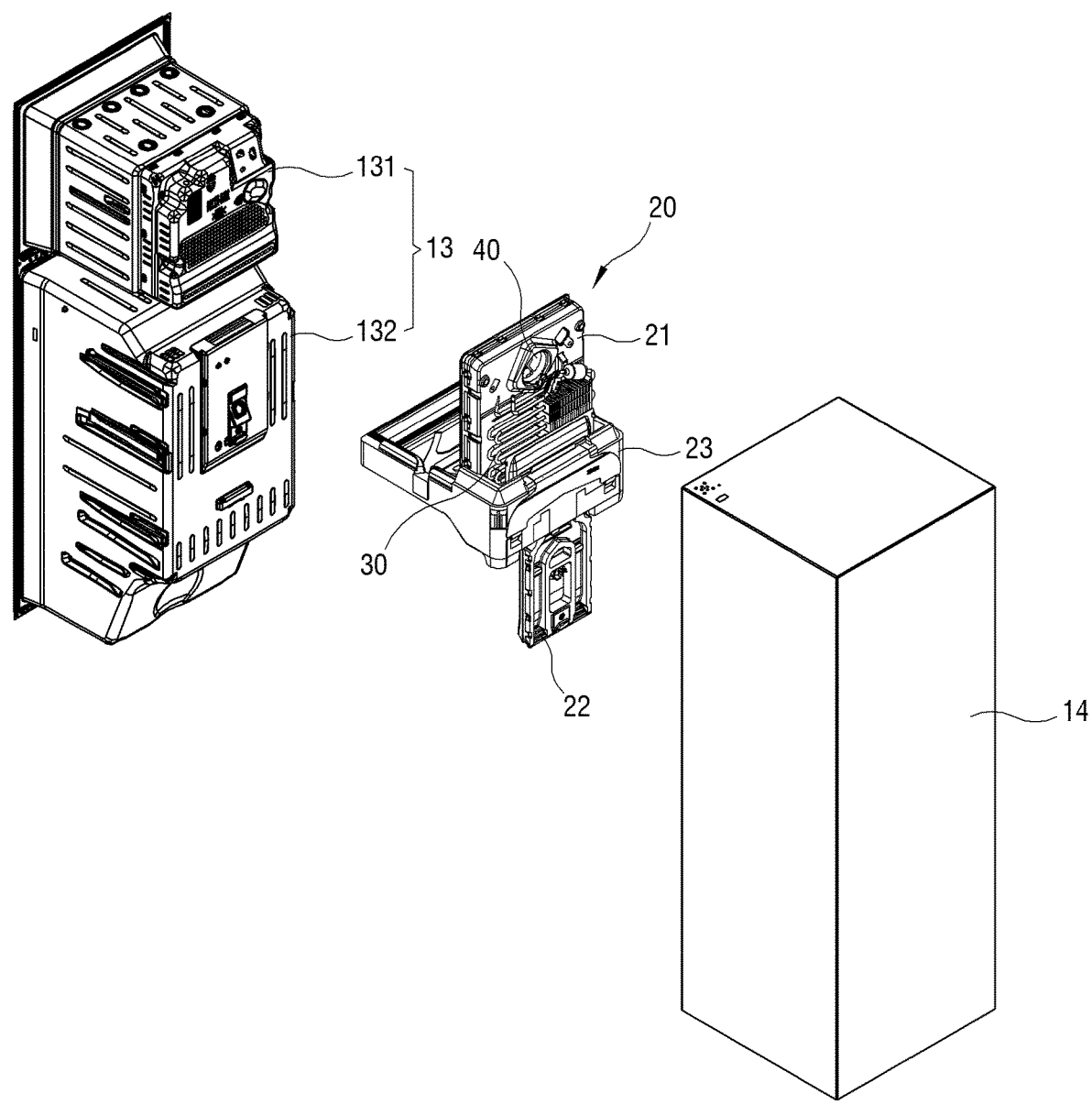
FIG. 2 is a view showing a disassembled state of the refrigerator of FIG. 1.

FIG. 1 is a view schematically showing a refrigerator 1 according to an embodiment, and FIG. 2 is a view showing a disassembled state of the refrigerator 1 of FIG. 1. In FIG. 1, the refrigerator 1 is illustrated without doors.

As shown in FIGS. 1 and 2, the refrigerator 1 may include a main body 10 provided with a freezer compartment 11 and a refrigerator compartment 12, a duct assembly 20 transferring cold air to the freezer compartment 11 and the refrigerator compartment 12, an evaporator 30 generating the cold air, and a fan 40 supplying the cold air generated by the evaporator 30 through the duct assembly 20.

The main body 10 may include an inner casing 13 and an outer casing 14 to form the freezer compartment 11 and the refrigerator compartment 12.

The inner casing 13 may include a freezer compartment casing 131 and a refrigerator compartment casing 132.

The outer casing 14 may form an outer appearance while surrounding the inner casing 13.

The duct assembly 20 may include first to third ducts 21, 22 and 23 provided with passages through which the cold air is transferred to the freezer compartment 11 and the refrigerator compartment 12.

The evaporator 30 may use a refrigerant that absorbs heat from air, thereby cooling the air.

The fan 40 may blow the cold air generated by the evaporator 30 to the freezer compartment 11 and the refrigerator compartment 12 through the first to third ducts 21, 22 and 23.

The refrigerator 1 according to an embodiment may for example be implemented by a general, side-by-side, or 3- to 4-door refrigerator according to the number and of doors and the opening method of doors. Further, the refrigerator 1 according to an embodiment may for example be implemented by a 1-EVA, 2-EVA, or 3-EVA refrigerator according to the number of evaporators for supplying cold air.

The refrigerator 1 according to an embodiment may be implemented by any type of refrigerator including at least one of the freezer compartment 11 or the refrigerator compartment 12 without being limited to various structures or purposes.

Figure 3:
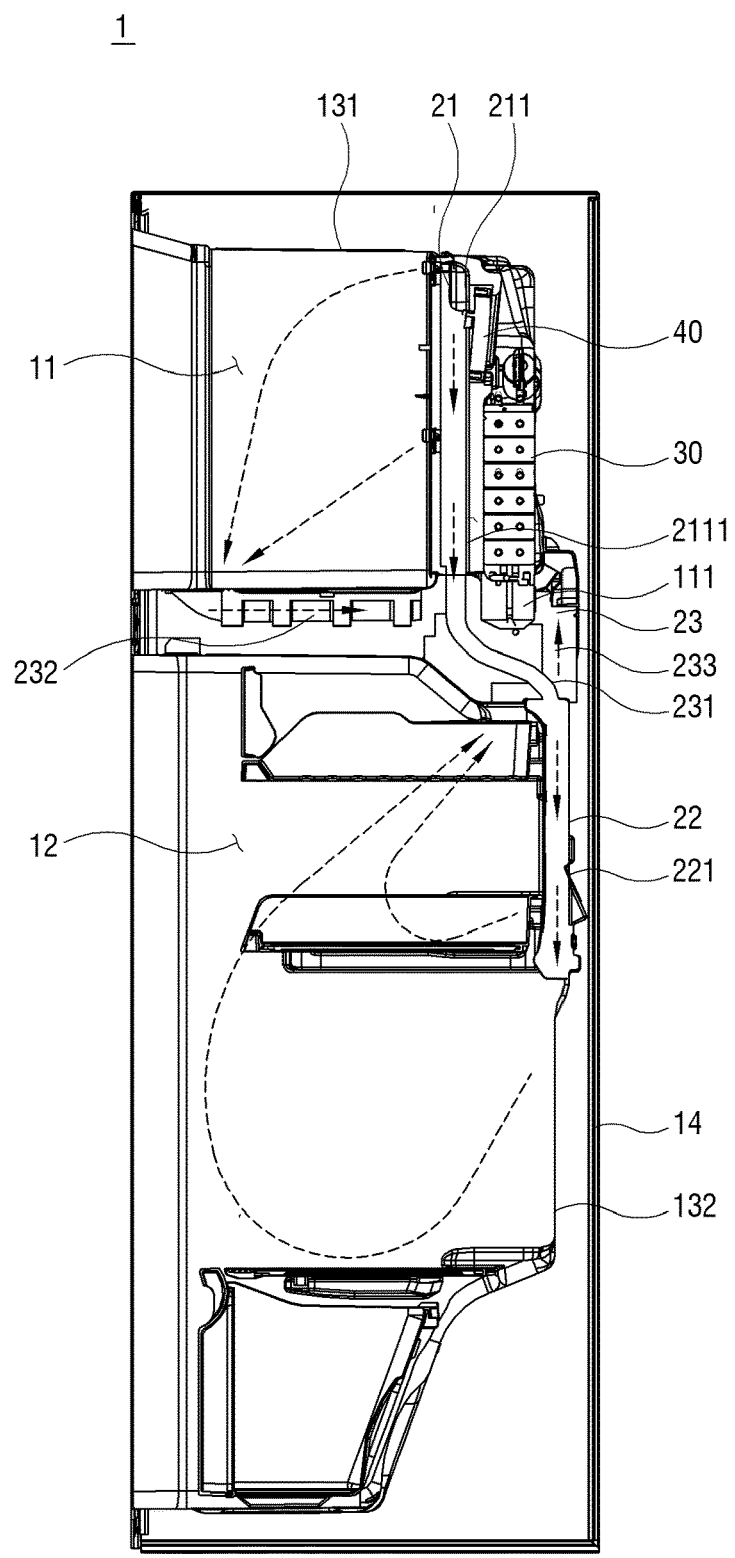
FIG. 3 is a view showing the flow of cold air in the refrigerator of FIG. 1.
Figure 4:
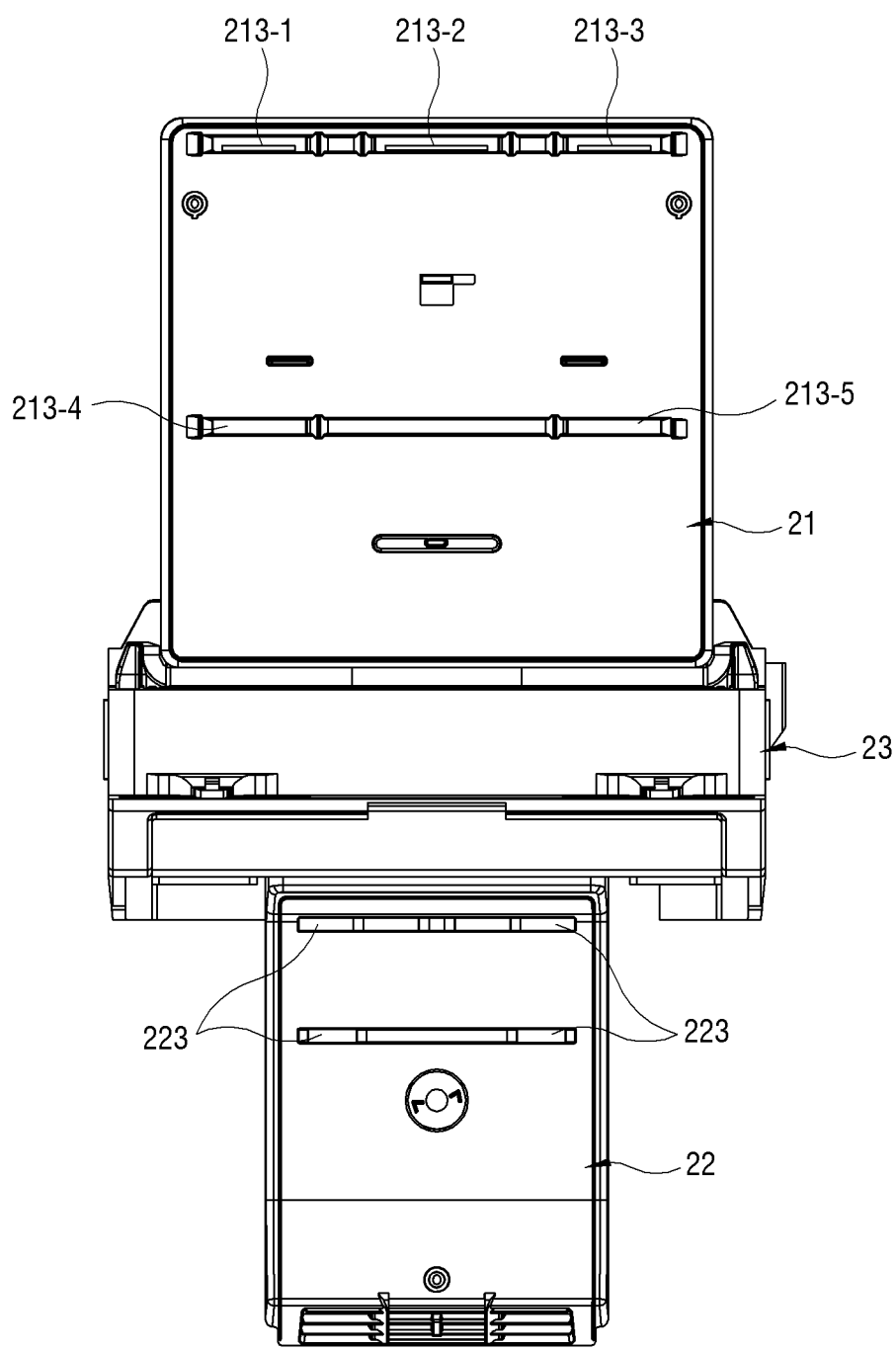
FIG. 4 is a front view of a duct assembly according to an embodiment.
Figure 5:
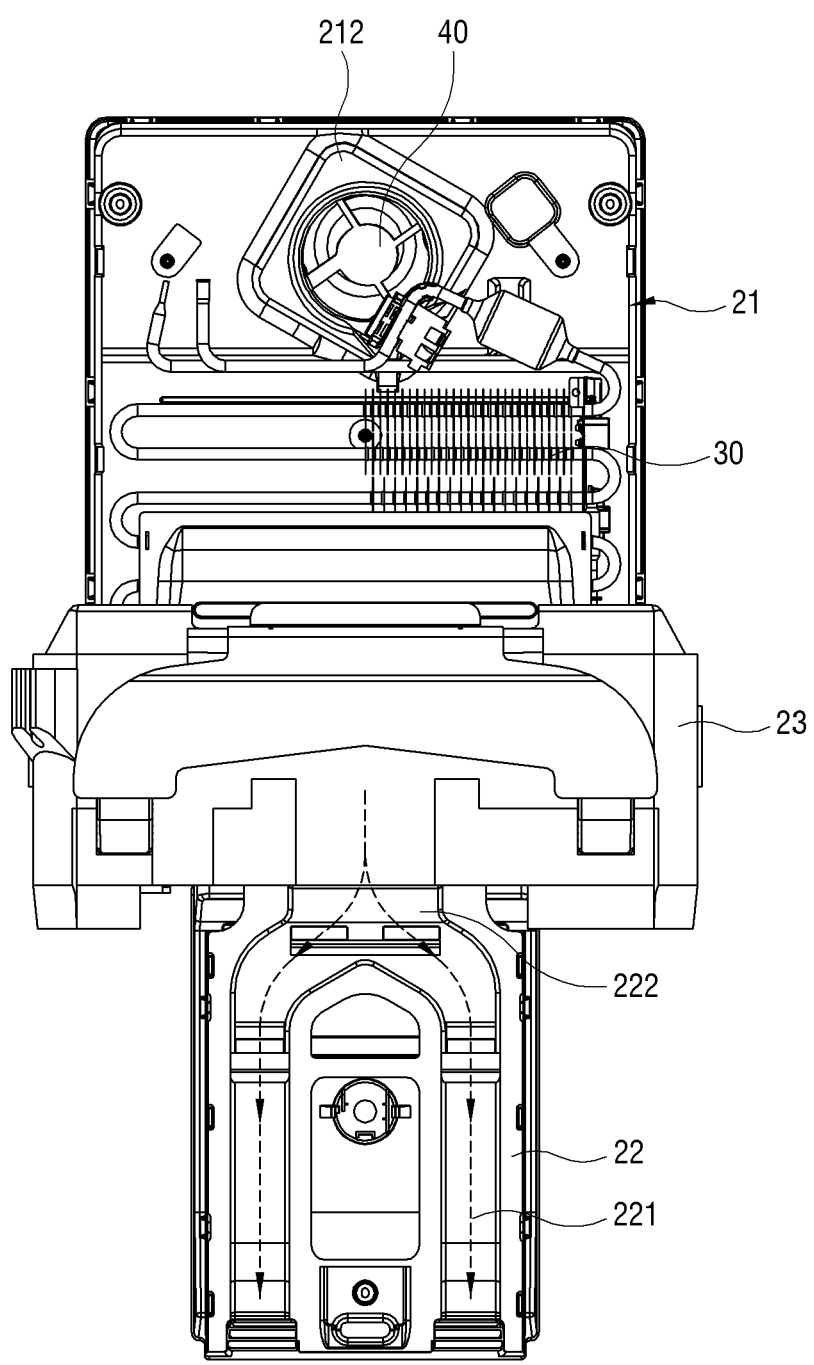
FIG. 5 is a rear view of a duct assembly according to an embodiment.
Figure 6:
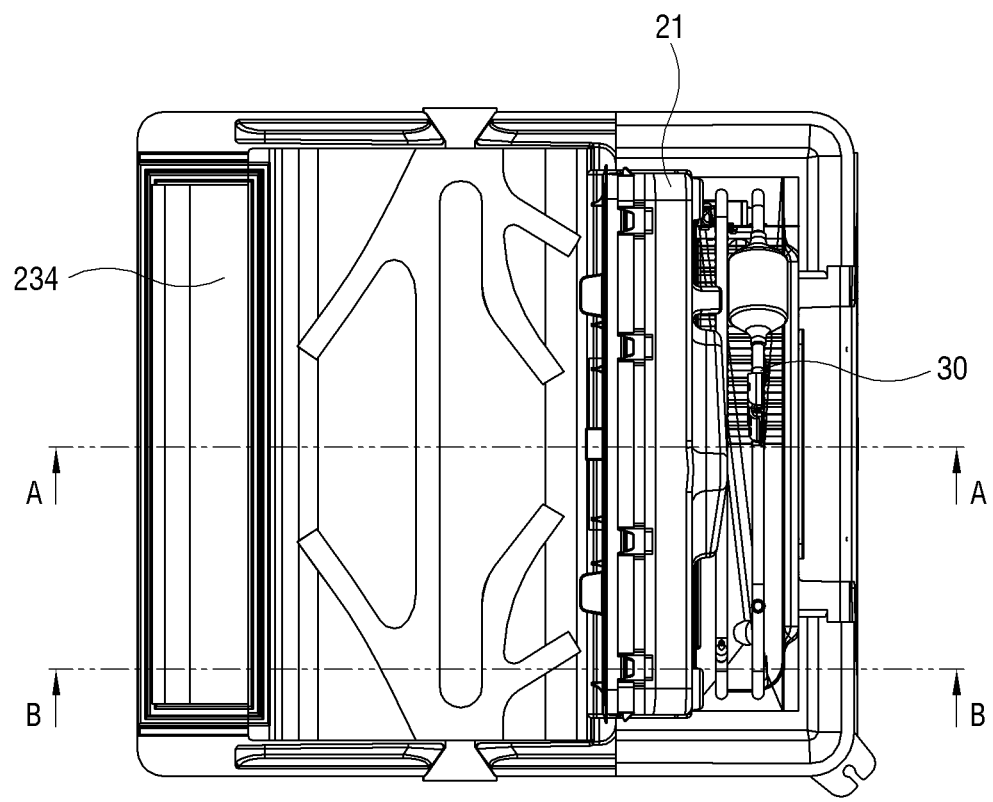
FIG. 6 is a plan view of a duct assembly according to an embodiment.
Figure 7:
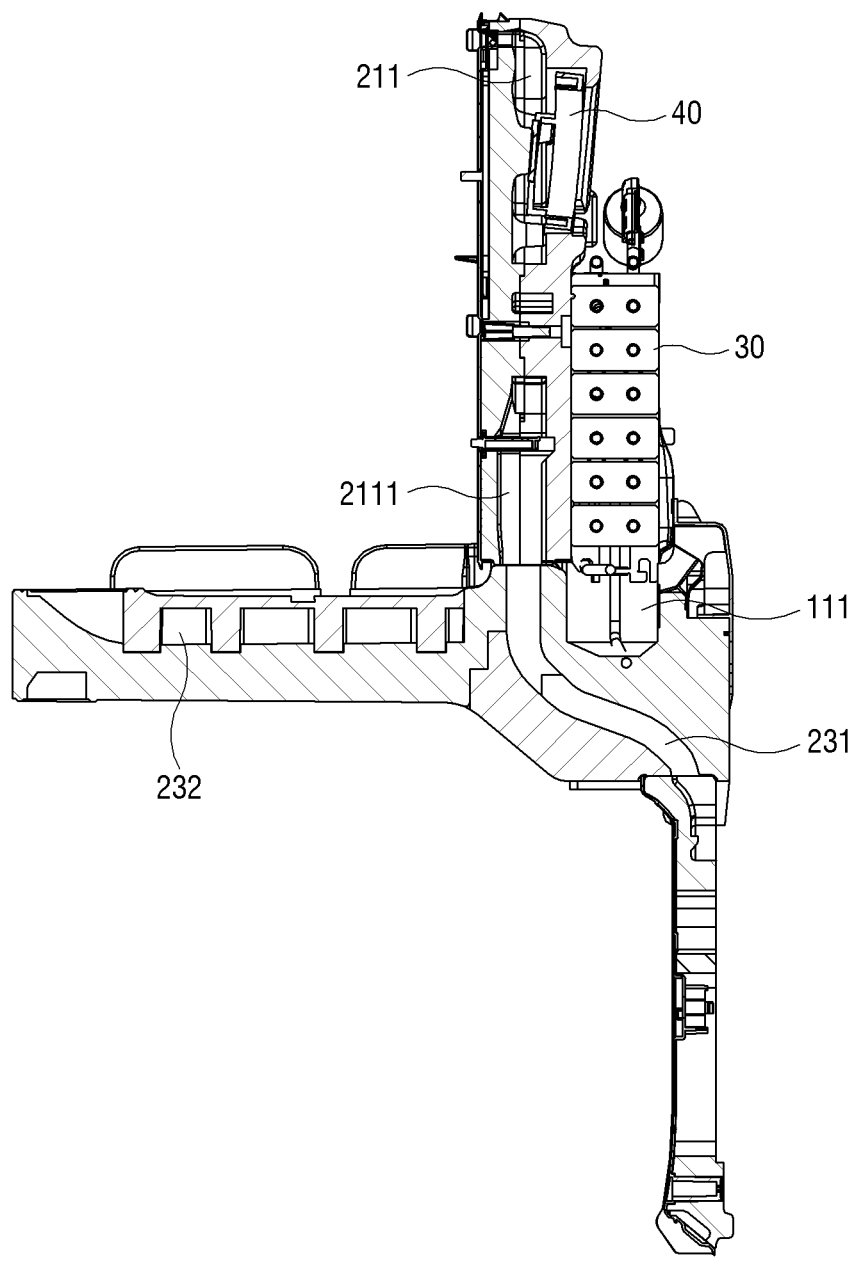
FIG. 7 is a view showing a cross-section taken along line A-A of FIG. 6.
Figure 8:
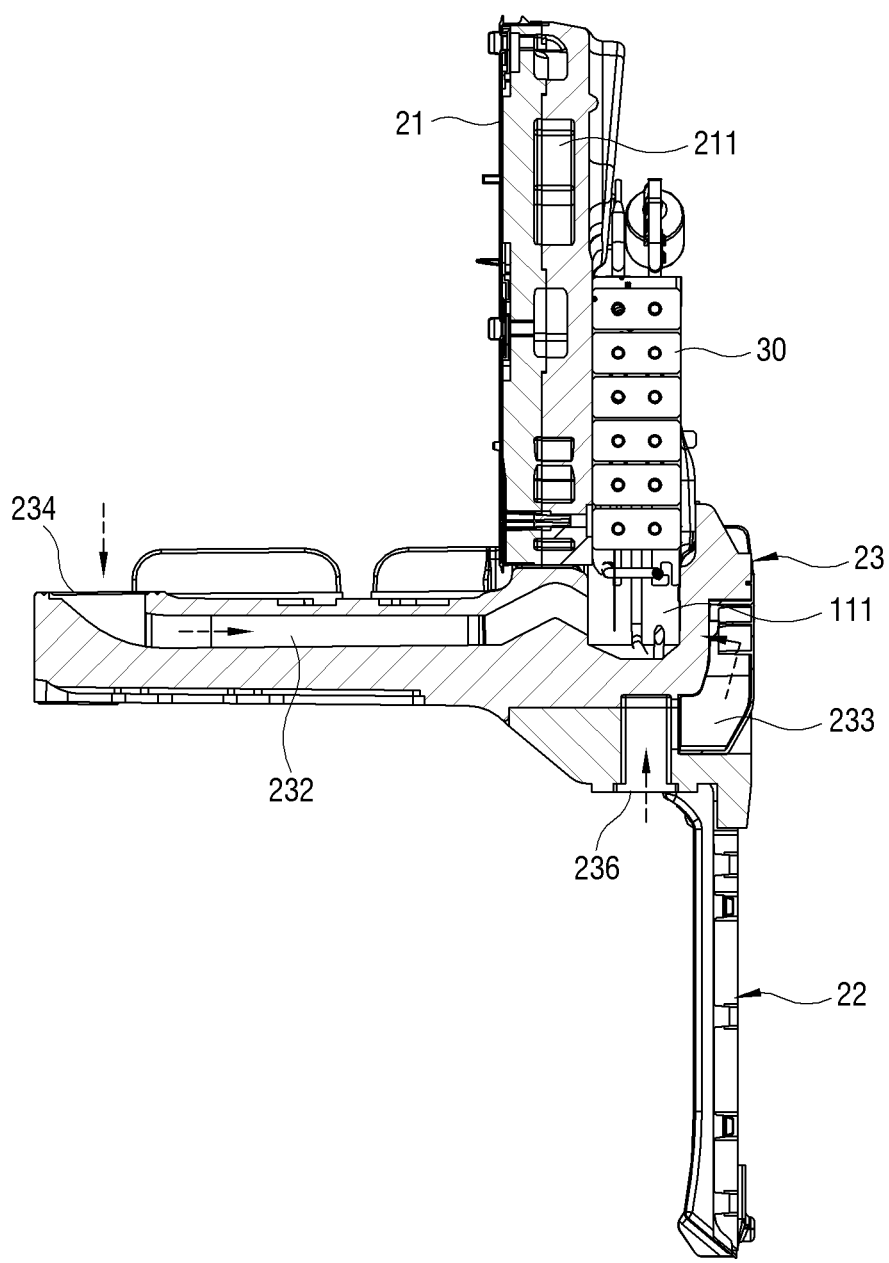
FIG. 8 is a view showing a cross-section taken along line B-B of FIG. 6.
Figure 9:
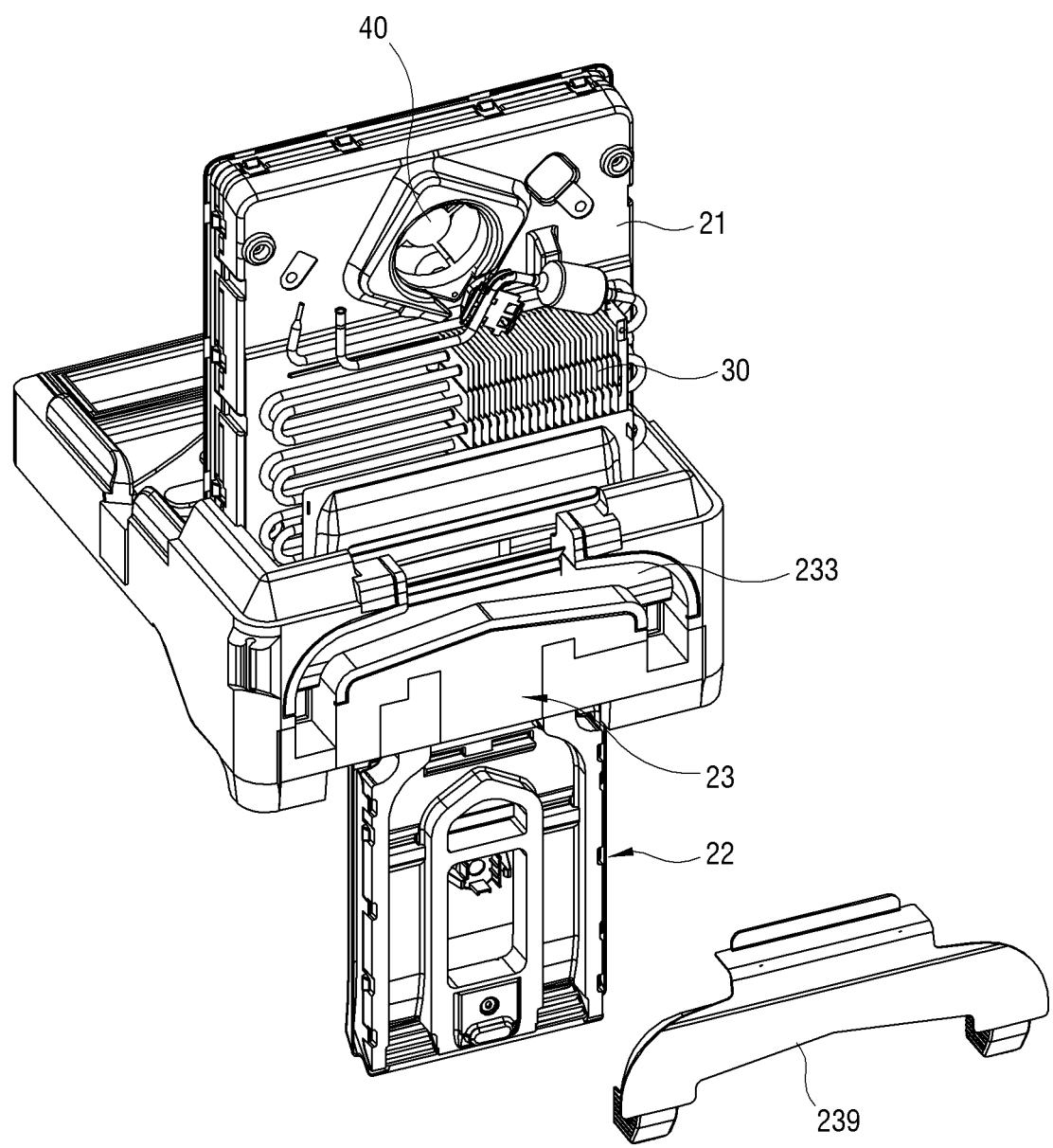
FIG. 9 is a view showing a fifth channel of a third duct according to an embodiment.

FIG. 3 is a view showing the flow of cold air in the refrigerator 1 of FIG. 1, FIG. 4 is a front view of the duct assembly 20 according to an embodiment, FIG. 5 is a rear view of the duct assembly 20 according to an embodiment, FIG. 6 is a plan view of the duct assembly 20 according to an embodiment, FIG. 7 is a view showing a cross-section taken along line A-A of FIG. 6, FIG. 8 is a view showing a cross-section taken along line B-B of FIG. 6, and FIG. 9 is a view showing a fifth channel 233 of a third duct 23 according to an embodiment As shown in FIGS. 3 to 7, the duct assembly 20 may include a first duct 21 forming a cold air generating space 111 provided at an inner rear of the freezer compartment casing 131 and isolated from the freezer compartment 11, a second duct 22 provided at an inner rear of the refrigerator compartment casing 132 and discharging the introduced cold air to the refrigerator compartment 12, and the third duct 23 transferring air from the freezer compartment 11 and the refrigerator compartment 11 to the evaporator 30. In the cold air generating space 111, the evaporator 30 may be disposed.

The first duct 21 may include a first channel 211 for guiding the cold air coming from the cold air generating space 111 through the fan 40 to the freezer compartment 11. The first channel 211 may include a first cold air inlet 212 into and in which the cold air from the cold air generating space 111 is introduced and the fan 40 is installed, and five, i.e., first to fifth cold air outlets 213 from which the cold air of the first channel 211 is discharged to the freezer compartment 11. The first channel 211 may include a connection channel 2111 to transfer the cold air to the third duct 23. The first channel 211 may refer to all the passages from the first cold air inlet 212 to the first to fifth cold air outlets 213 and the connection channel 2111.

The second duct 22 may include a second channel 221 for guiding guide some of the cold air introduced from the first channel 211 to the refrigerator compartment 12. The second duct 22 may include a second cold air inlet 222 into which the cold air is introduced through the first duct 21, and a plurality of cold air outlets 223 from which the cold air of the second channel 221 is discharged to the refrigerator compartment 12.

The third duct 23 may, as shown in FIGS. 7 and 8, include a third channel 231 for connecting the first channel 211 and the second channel 221, a fourth channel 232 for guiding the air of the freezer compartment 11 to the cold air generating space 111, and the fifth channel 233 for guiding the air of the refrigerator compartment 12 to the cold air generating space 111.

The third duct 23 may include a third cold air inlet 234 into which air that has absorbed heat from the freezer compartment 11 is introduced. The air introduced into the third cold air inlet 234 may be discharged to the cold air generating space 111 through the fourth channel 232.

The third duct 23 may, as shown in FIGS. 8 and 9, include a fourth cold air inlet 236 into which air that has absorbed heat from the refrigerator compartment 12 is introduced. The air introduced into the fourth cold air inlet 236 may be discharged to the cold air generating space 111 through the fifth channel 233.

The fifth channel 233 may be formed as the rear of the third duct 23 is recessed and then covered with a channel cover 239.

Figure 10:
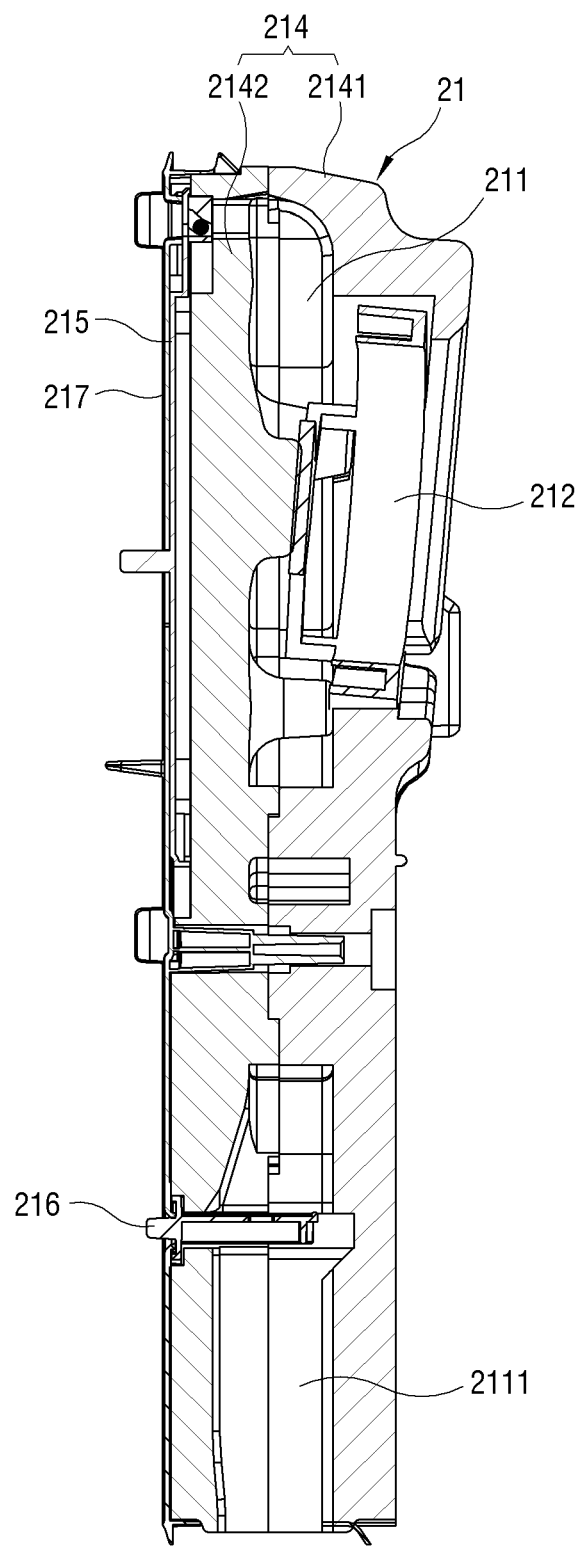
FIG. 10 is a view showing a cross-section of a first duct according to an embodiment.
Figure 11:
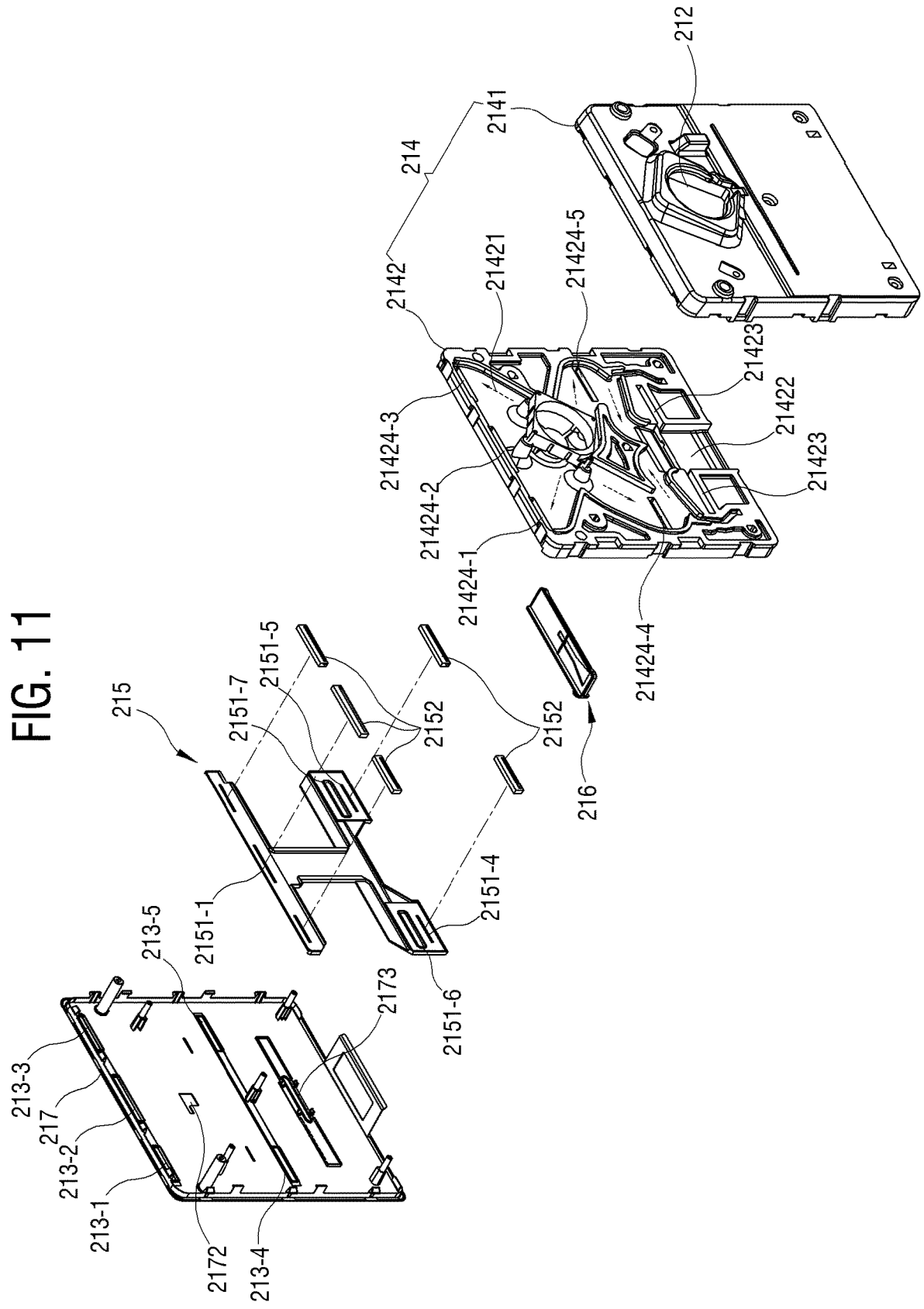
FIG. 11 is an exploded front view of a first duct according to an embodiment.
Figure 12:
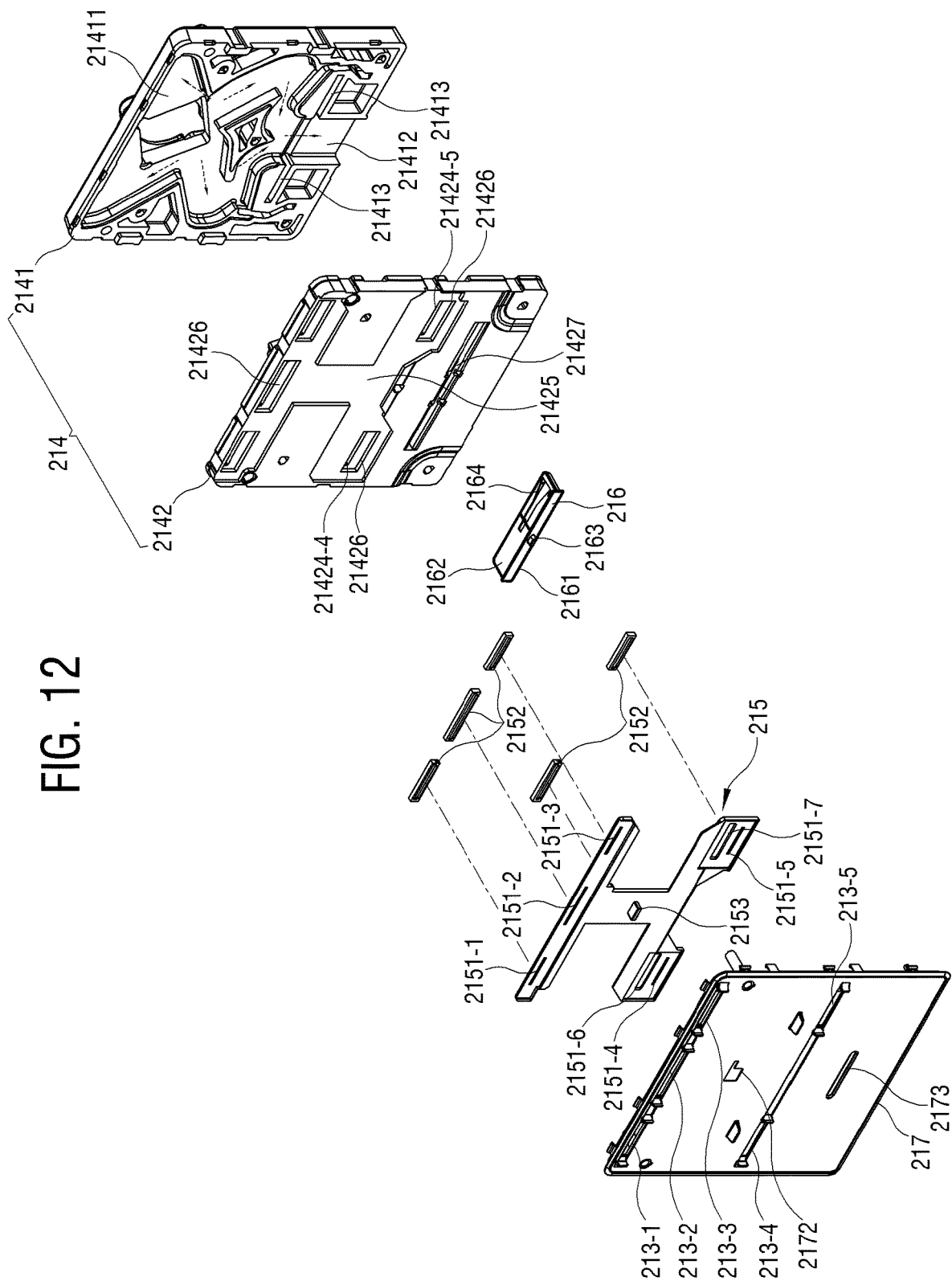
FIG. 12 is an exploded rear view of a first duct according to an embodiment.
Figure 13:
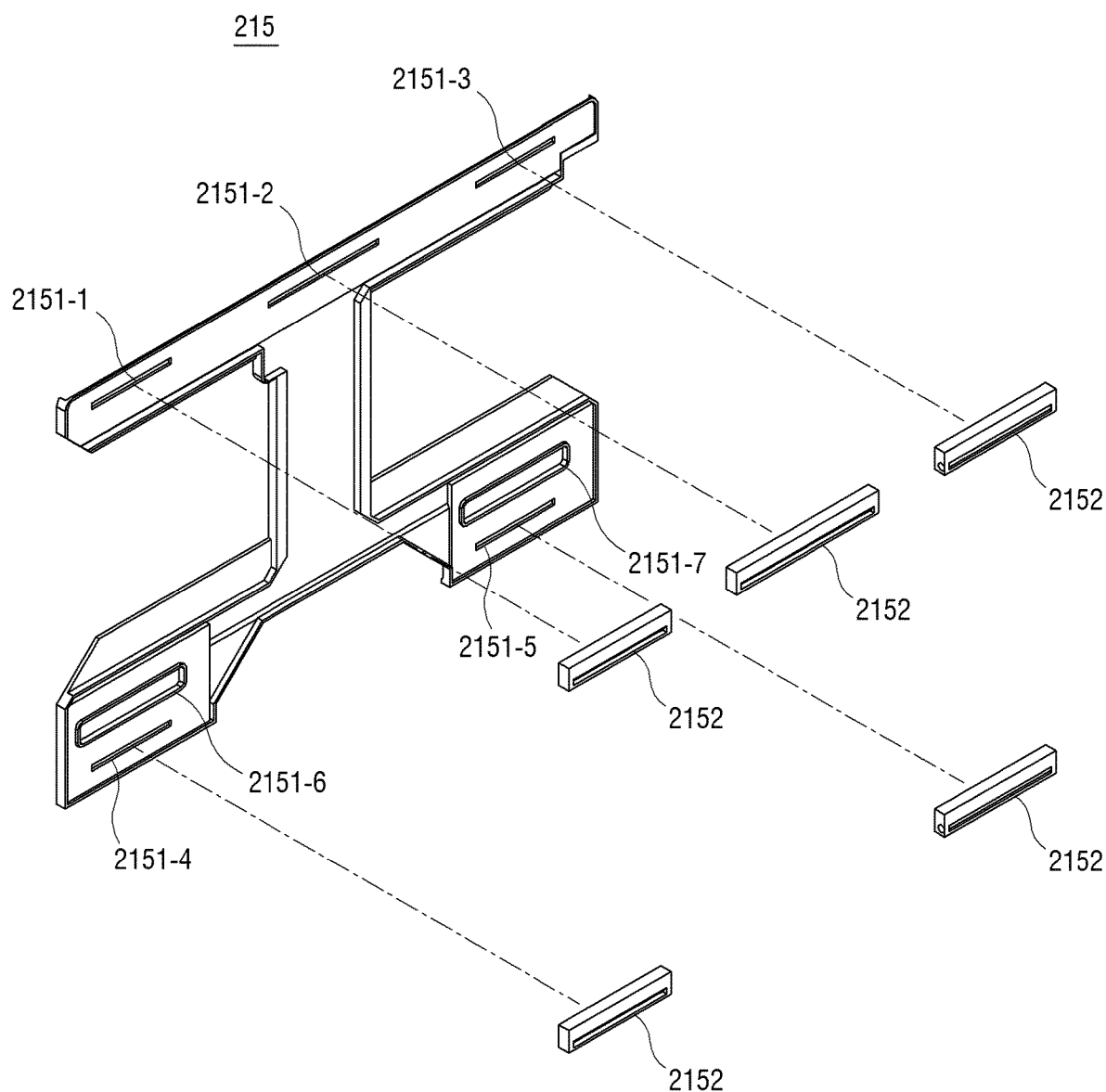
FIG. 13 is a view showing a first cold-air control unit according to an embodiment.
Figure 14:
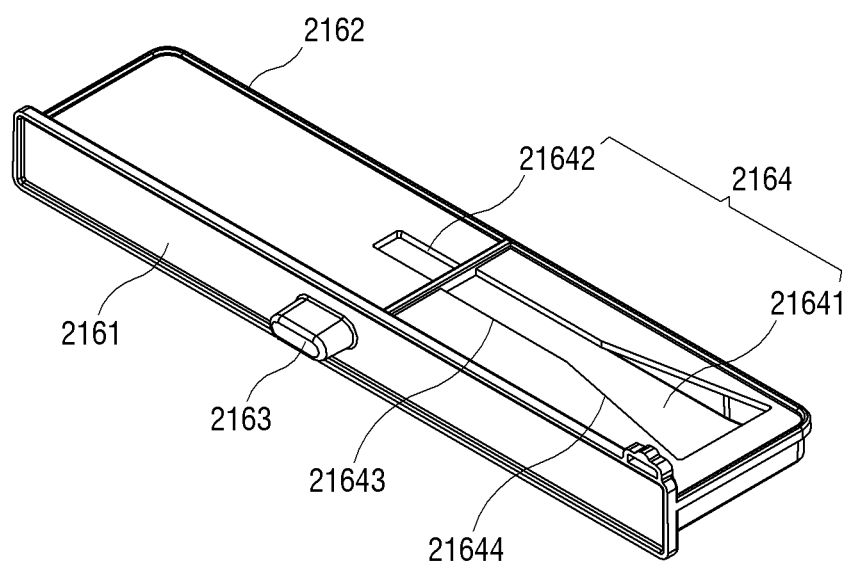
FIG. 14 is a view showing a second cold-air control unit according to an embodiment.

FIG. 10 is a view showing a cross-section of the first duct 21 according to an embodiment, FIG. 11 is an exploded front view of the first duct 21 according to an embodiment, FIG. 12 is an exploded rear view of the first duct 21 according to an embodiment, FIG. 13 is a view showing a first cold-air control unit 215 according to an embodiment, and FIG. 14 is a view showing a second cold-air control unit 216 according to an embodiment.

As shown in FIGS. 10 to 14, the first duct 21 may include a channel forming portion 214 internally formed with the first channel 211, the first and second cold-air control units 215 and 216 for respectively controlling the amount of cold air supplied to the freezer compartment 11 and the refrigerator compartment 12, and a mounting cover 217 for mounting the first and second cold-air control units 215 and 216 to the channel forming portion 214.

The channel forming portion 214 may include first and second channel members 2141 and 2142 shaped like plates and coupling with each other while forming the first channel 211 therein.

The first channel member 2141 may be disposed at the side of the evaporator 30 (see FIG. 5). The first channel member 2141 may include a cold air inlet 212a formed penetrating an upper portion thereof, and a first channel groove 21411, a first connection channel groove 21412, and a first guide groove 21413 traversing the first connection channel groove 21412, which are recessed on a surface thereof facing toward the second channel member 2142.

The second channel member 2142 may include a second channel groove 21421, a second connection channel groove 21422, and a second guide groove 21423 traversing the second connection channel groove 21422, which are recessed on a surface thereof facing toward the first channel member 2141.

The first and second channel grooves 21411 and 21421 may engage with each other forming the first channel 211.

The first and second connection channel grooves 21412 and 21422 may engage with each other forming the connection channel 2111. The connection channel 2111 may guide the cold air of the first channel 211 to the third channel 231 of the third duct 23.

The first and second guide grooves 21413 and 21423 may engage with each other to guide the second cold-air control unit 216 (to be described later) to be inserted and moved therein.

The second channel member 2142 may include first to third cold air holes 21424-1 to 21424-3 formed penetrating an upper portion thereof, and fourth and fifth cold air holes 21424-4 and 21424-5 formed penetrating a middle portion thereof, which are communicating with the second channel groove 21421.

The second channel member 2142 may include a control unit mounting groove 21425 recessed on a surface facing toward the mounting cover 217 and having an 'H' shape at positions corresponding to the first to fifth cold air holes 21424-1 to 21424-5 so that the first cold-air control unit 215 (to be described later) can be mounted thereto. The control unit mounting groove 21425 may be large enough to allow the first cold-air control unit 215 to move up, down, left and right.

The second channel member 2142 may include damper grooves 21426 in which damper units 2152 of the first cold-air control unit 215 (to be described later) are accommodated while surrounding the cold air holes 21424-1 to 21424-5 formed on the surface facing toward the mounting cover 217.

The second channel member 2142 may include a control unit mounting hole 21427 formed penetrating a lower portion thereof and communicating with first and second connection channel grooves 21412 and 21422. The control unit mounting hole 21427 allows the second cold-air control unit 216 to be inserted therein and mounted thereto.

The cold-air control unit 215 and 216 may include the first cold-air control unit 215 to adjust the size of the first to fifth cold air outlets 213-1 to 213-5 for supplying the cold air to the freezer compartment 11, and the second cold-air control unit 216 provided in the connection channel 2111 to adjust the amount of cold air supplied to the refrigerator compartment 12.

The first cold-air control unit 215 may be disposed on the control unit mounting groove 21425 having an 'H' shape and then mounted by coupling the mounting cover 217 to the channel forming portion 214.

The first cold-air control unit 215 may include first to fifth openings 2151-1 to 2151-5, five damper units 2152 respectively provided in the first to fifth openings 2151-1 to 2151-5 on a surface thereof facing toward the second channel member 2142, and a first knob 2153 protruding from the center on a surface thereof facing toward the mounting cover 217. The first cold-air control unit 215 may further include sixth and seventh openings 2151-6 and 2151-7 above the fourth and fifth openings 2151-4 and 2151-5. The sizes of sixth and seventh openings 2151-6 and 2151-7 may be equal to or greater than fourth and fifth cold air outlets 213-4 and 213-5 of the mounting cover 217 (to be described later). The sixth and seventh openings 2151-6 and 2151-7 may be respectively aligned with the fourth and fifth cold air outlets 213-4 and 213-5 when the first cold-air control unit 215 is located for the freezing mode, thereby allowing the cold air to flow without obstruction.

The damper units 2152 may be aligned with the first to fifth cold air outlets 213-1 to 213-5 of the mounting cover 217 when the first cold-air control unit 215 is located for the refrigerating mode. The opening degrees of the damper units 2152 may vary depending on the strength of cold air due to the rotating speed of the fan 40. The operations of the damper units 2152 will be described later.

The first knob 2153 may be exposed to the inside of the freezer compartment 11 so as to be manipulated by a user. The first knob 2153 may be moved up, down, left and right by a user. In other words, a user may hold the first knob 2153 and move the first cold-air control unit 215, thereby switching the freezer compartment 11 over among "the freezing mode", "the refrigerating mode" and "the off mode." The detailed operations of the first cold-air control unit 215 will be described later.

The second cold-air control unit 216 may include a front frame 2161 standing at the front thereof, a rear frame 2162 extending horizontally from the rear of the front frame 2161, a second knob 2163 protruding frontward from the front frame 2161, and a cold-air through hole 2164 formed penetrating the rear frame 2162. The cold-air through hole 2164 may include a main cold-air through hole 21641 and a sub cold-air through hole 21642. The main cold-air through hole 21641 may include a linear extending portion 21643 extended having a predetermined width, and an enlarged portion 21644 gradually enlarged integrally extending from the linear extending portion 21643.

The second cold-air control unit 216 may be mounted by coupling the mounting cover 217 to the channel forming portion 214 in the state that the rear frame 2162 is inserted in the control unit mounting hole 21427.

The second knob 2163 protrudes into the freezer compartment 11 and is thus manipulated by a user. The second knob 2163 is movable left and right. A user may manipulate the second knob 2163 left and right to adjust the amount of cold air passing through the connection channel 2111. The operations of the second cold-air control unit 216 will be described later.

The mounting cover 217 may be coupled to the channel forming portion 214 while interposing the first and second cold-air control units 215 and 216 therein.

The mounting cover 217 may be exposed in the freezer compartment 11. The mounting cover 217 may include the first to fifth cold air outlets 213-1 to 213-5 respectively communicating with the first to fifth cold air holes 21424-1 to 21424-5 of the second channel member 2142, a first knob hole 2172 accommodating the first knob 2153 to move up, down, left and right, and a second knob hole 2173 accommodating the second knob 2163 to move left and right.

Figure 15:
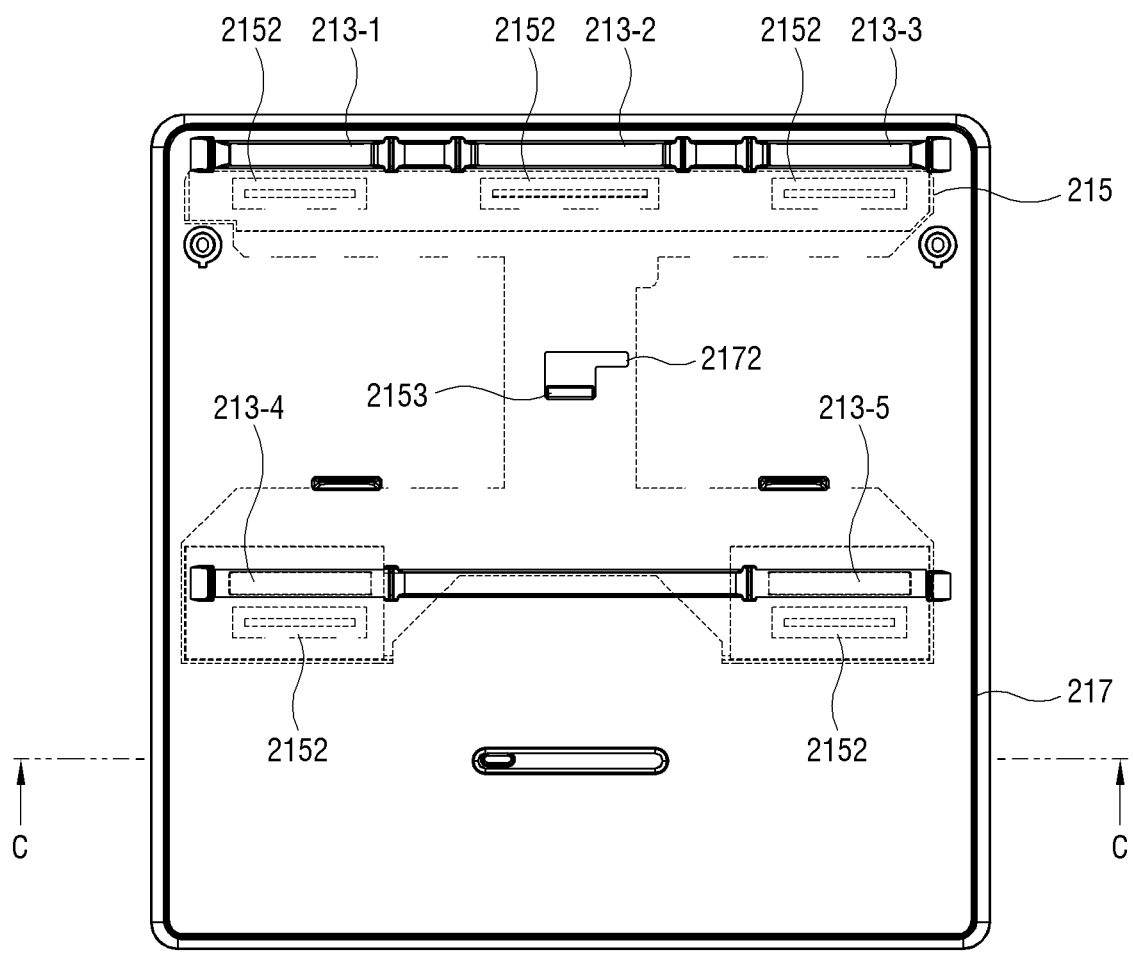
FIG. 15 is a view showing a freezing-mode state of a first cold-air control unit in a first duct according to an embodiment.

FIG. 15 is a view showing the freezing-mode state of the first cold-air control unit 215 in the first duct 21.

As shown in FIG. 15, the first knob 2153 is located in a lower portion of the first knob hole 2172. In this case, the upper end of the first cold-air control unit 215 is located below the first to third cold air outlets 213-1 to 213-3 of the mounting cover 217, and the sixth and seventh openings 2151-6 and 2151-7 (see FIG. 13) of the first cold-air control unit 215 are aligned with the fourth and fifth cold air outlets 213-4 and 213-5 in the middle of the mounting cover 217, so that the first to fifth cold air holes 21424-4 to 21424-5 of the mounting cover 217 can be fully opened to normally pass the cold air therethrough. Therefore, the freezer compartment 11 can maintain a freezing function. In this case, the five damper units 2152 are located below the first to fifth cold air holes 21424-1 to 21424-5 of the mounting cover 217, and thus do not interwork with the flow of the cold air.

Figure 16:
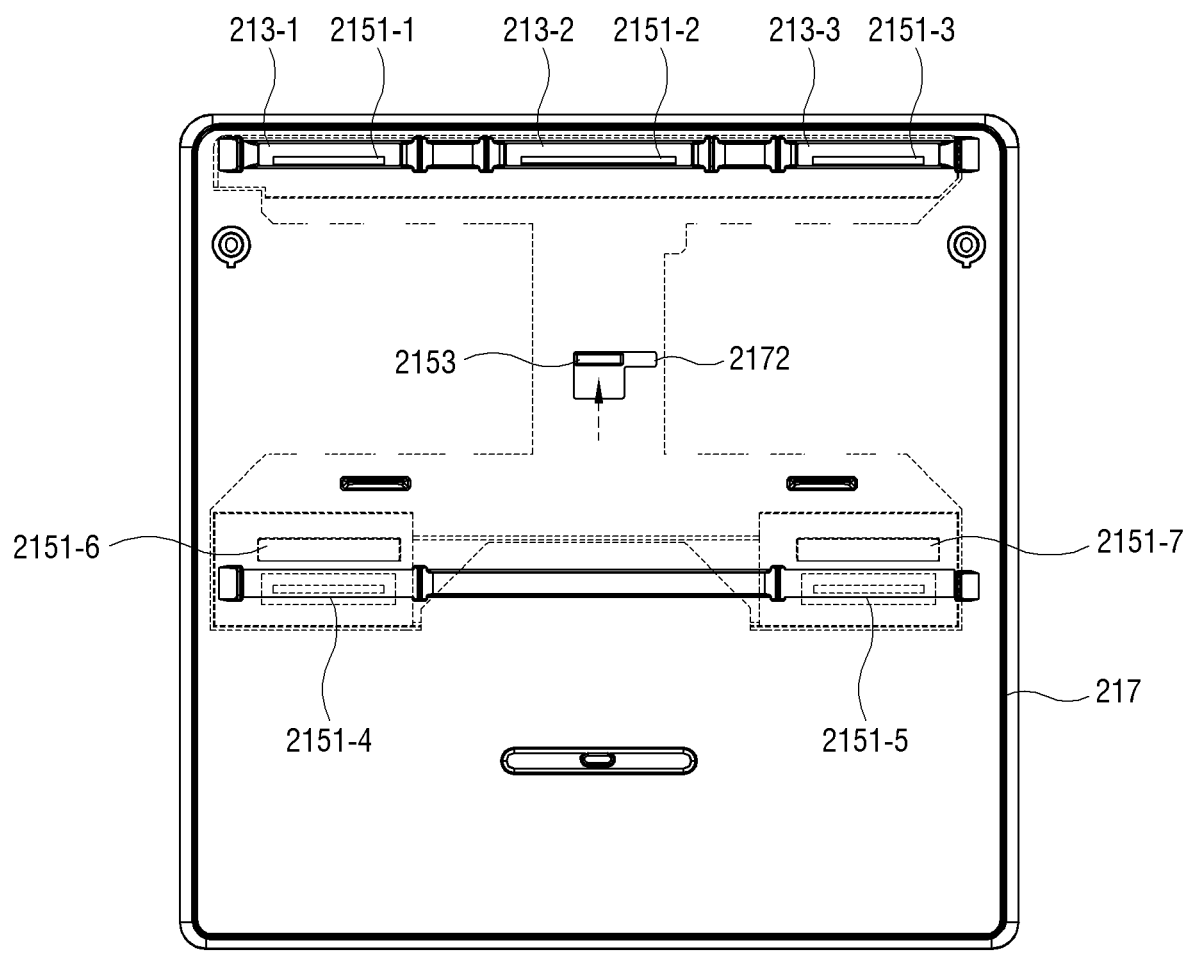
FIG. 16 is a view showing a refrigerating-mode state of a first cold-air control unit according to an embodiment.

FIG. 16 is a view showing the refrigerating-mode state of the first cold-air control unit 215.

As shown in FIG. 16, the first knob 2153 is moved to an upper portion of the first knob hole 2172. In this case, the five damper units 2152 provided in the first to fifth openings 2151-1 to 2151-5 of the first cold-air control unit 215 are aligned with the first to fifth cold air outlets 213-1 to 213-5 of the mounting cover 217, thereby passing the cold air therethrough as the strength of the cold air can be adjusted according to the functions of the damper units 2152, i.e., in conjunction with the rotating speed of the fan 40. Meanwhile, the sixth and seventh openings 2151-6 and 2151-7 of the first cold-air control unit 215 are moved above the fourth and fifth cold air outlets 213-4 and 213-5 of the mounting cover 217, and thus do not interwork with the flow of the cold air.

Below, the structure and operations of the damper units 2152 will be described with reference to FIGS. 17 and 18.

Figure 17:
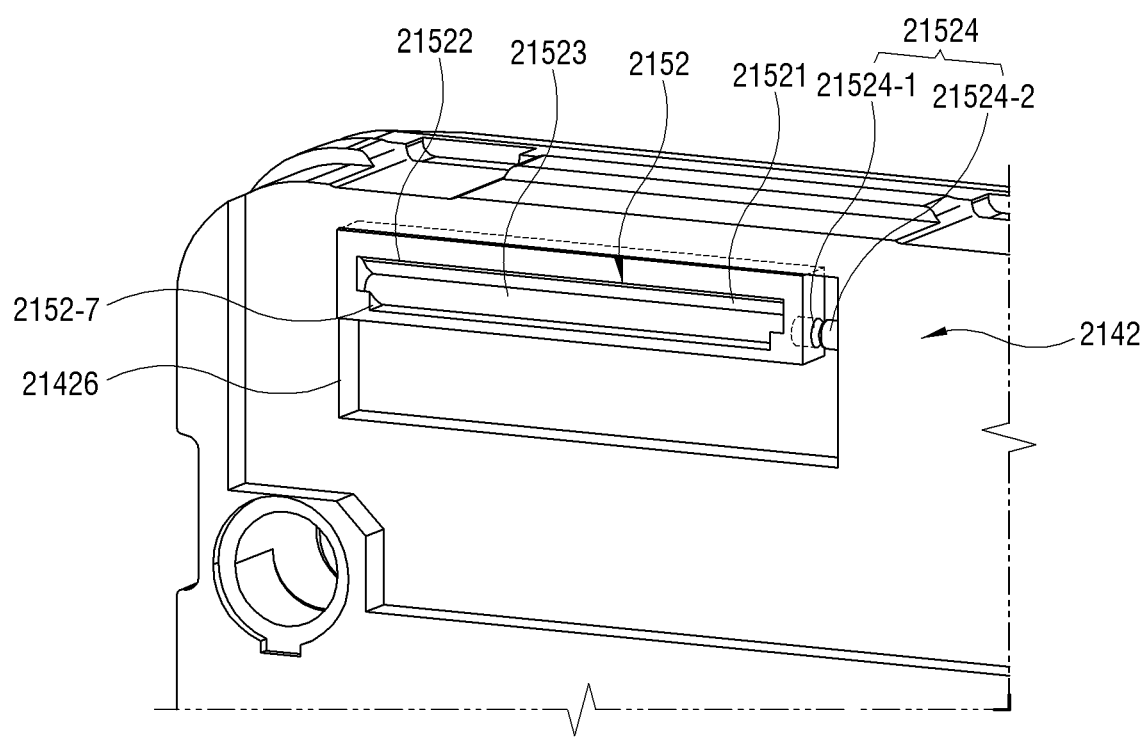
FIG. 17 is a perspective view showing that a damper unit according to an embodiment is mounted to a second channel member.
Figure 18:
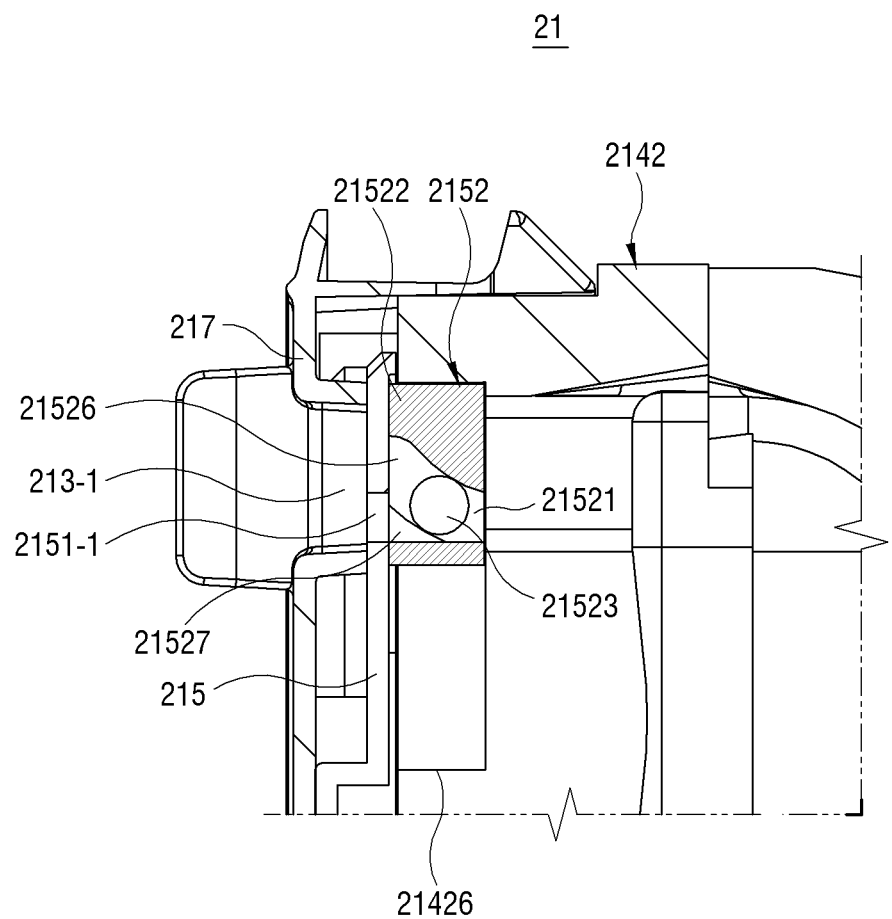
FIG. 18 is a cross-sectional view showing that a damper unit according to an embodiment is mounted to a first duct.

FIG. 17 is a perspective view showing that the damper unit 2152 is mounted to the second channel member 2142, and FIG. 18 is a cross-sectional view showing that the damper unit 2152 is mounted to the first duct 21.

The damper units 2152 may, as shown in FIG. 18, be selectively located between the first cold air outlet 213-1 of the mounting cover 217 and the first cold air hole 21424-1 of the second channel member 2142.

The damper units 2152 includes a housing 21522, a damper 21523 movably accommodated in the housing 21522, and a stopper 21524 provided at one side of a variable channel 21521 and preventing the movement of the damper 21523. The stopper 21524 may include a stopper hole 21524-1 formed penetrating a lateral wall of the variable channel 21521, and a protrusion 21524-2 protruding from the damper grooves 21426 of the second channel member 2142 toward the stopper hole 21524-1.

The housing 21522 may be internally provided with the variable channel 21521 extended horizontally. The variable channel 21521 may have a cross-section gradually enlarged from the entrance where the cold air is introduced toward the upper portion thereof. At the opposite sides of the variable channel 21521, the damper guides 21527 may be provided to hold both ends of the damper 21523 and guide the damper 21523 to move to an upper extension space 21526. The damper guide 21527 may be gradually inclined upward at the entrance of the variable channel 21521 where the cold air is introduced.

The damper 21523 may for example be shaped like a cylindrical rod and hung on the damper guides 21527 provided at the opposite sides of the variable channel 21521. The damper 21523 may be pushed up to the upper extension space 21526 along the inclined damper guide 21527 as the strength of the introduced cold air is increased by the increasing rotating speed of the fan 40. In this case, the protrusion 21524-2 of the stopper 21524 is out of the stopper hole 21524-1. Then, the protrusion 21524-2 of the stopper 21524 returns to the original position by its own weight when the strength of the cold air is gradually decreased by the decreasing rotating speed of the fan 40, thereby partially or completely blocking the entrance of the variable channel 21521 into which the cold air is introduced. The degree of response of the damper 21523 to the strength of the cold air, i.e., the rotating speed of the fan 40 may be varied depending on the weight of the damper 21523.

The degree of movement of the damper 21523 along the damper guide 21527 may be small when the rotating speed of the fan 40 is low and the strength of the cold air is low. Therefore, a small gap may be formed between the bottom of the variable channel 21521 and the damper 21523, thereby allowing a small amount of cold air to be introduced into the freezer compartment 11.

The degree of movement of the damper 21523 along the damper guide 21527 may be large when the rotating speed of the fan 40 is high and the strength of the cold air is high. As a result, the damper 21523 is pushed up high from the bottom of the variable channel 21521. Therefore, a large gap may be formed between the bottom of the variable channel 21521 and the damper 21523, thereby allowing a large amount of cold air to be introduced into the freezer compartment 11.

In the case where the freezer compartment 11 is used for the refrigerating mode, the inner temperature of the freezer compartment 11 suddenly rises when the door of the freezer compartment 11 is opened, and it is necessary to quickly cool the inside of the freezer compartment 11. To this end, when the load of the fan 40 is increased, the strength of the cold air flowing in the variable channel 21521 increases, thereby pushing up the damper 21523 and enlarging the gap through which the cold air passes. Then, when the load of the fan 40 is decreased as the temperature of the freezer compartment 11 is lowered up to a set temperature, the damper 21523 returns to a lower position. In this way, in the refrigerating mode, the amount of cold air supplied to the freezer compartment 11 by the damper units 2152 of the first cold-air control unit 215 is adjustable in conjunction with the strength of the cold air, in other words, the rotating speed of the fan 40.

Figure 19:
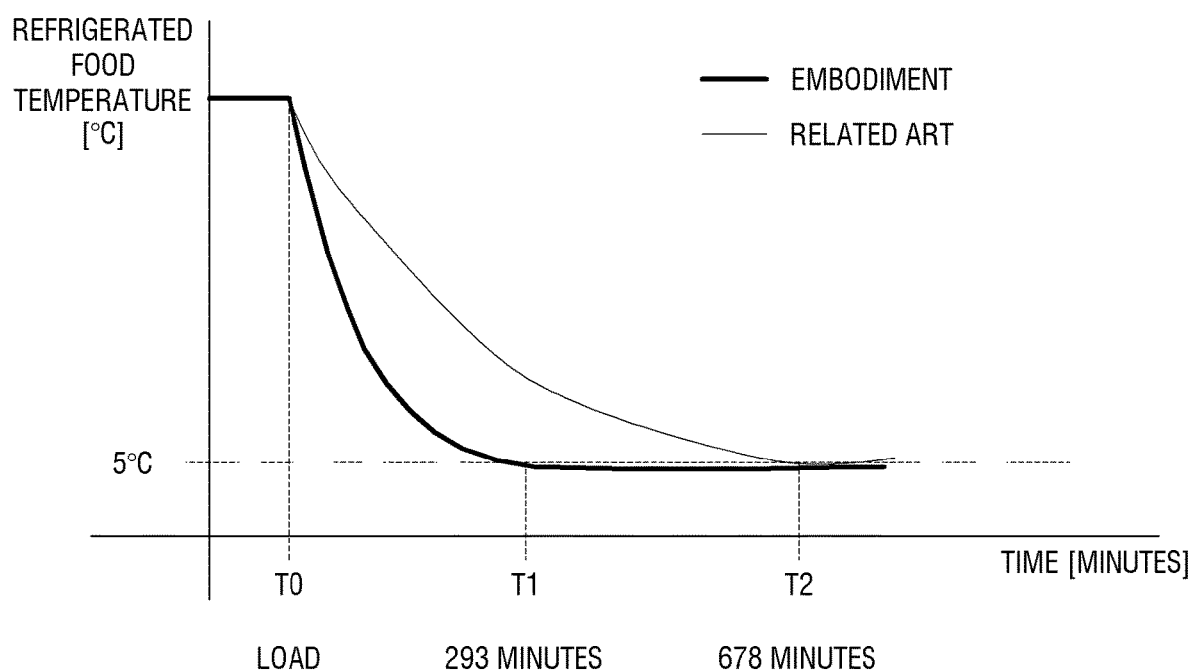
FIG. 19 is a graph showing comparison in cooling effect between a related art and an embodiment.

FIG. 19 is a graph showing comparison in cooling effect between a related art and an embodiment. While the related art introduced a certain amount of cold air regardless of the strength of cold air due to the rotating speed of the fan in, the embodiment employed the damper units 2152 and increased the load of the fan 40 when the door of the freezer compartment 11 was opened or when the temperature of the freezer compartment 11 suddenly rose.

As shown in FIG. 19, it took 293 minutes to lower the refrigerated food temperature to 5° C. in the embodiment, but it took 678 minutes to lower the refrigerated food temperature to 5° C. in the related art. Thus, the embodiment takes a shorter cooling time than the related art, thereby refrigerating the stored food safely.

Figure 20:
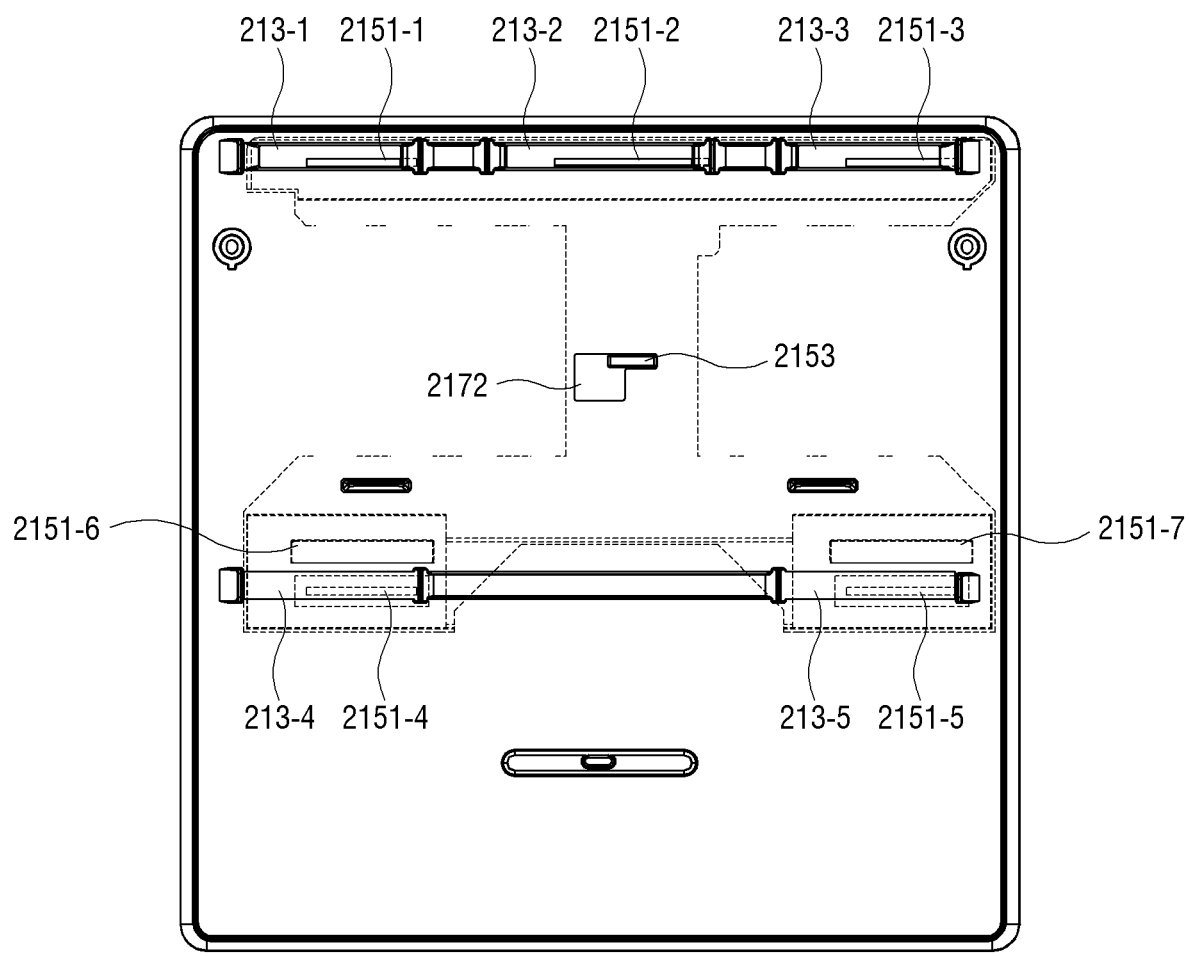
FIG. 20 is a view showing an off-mode state of a first cold-air control unit according to an embodiment.
Figure 21:
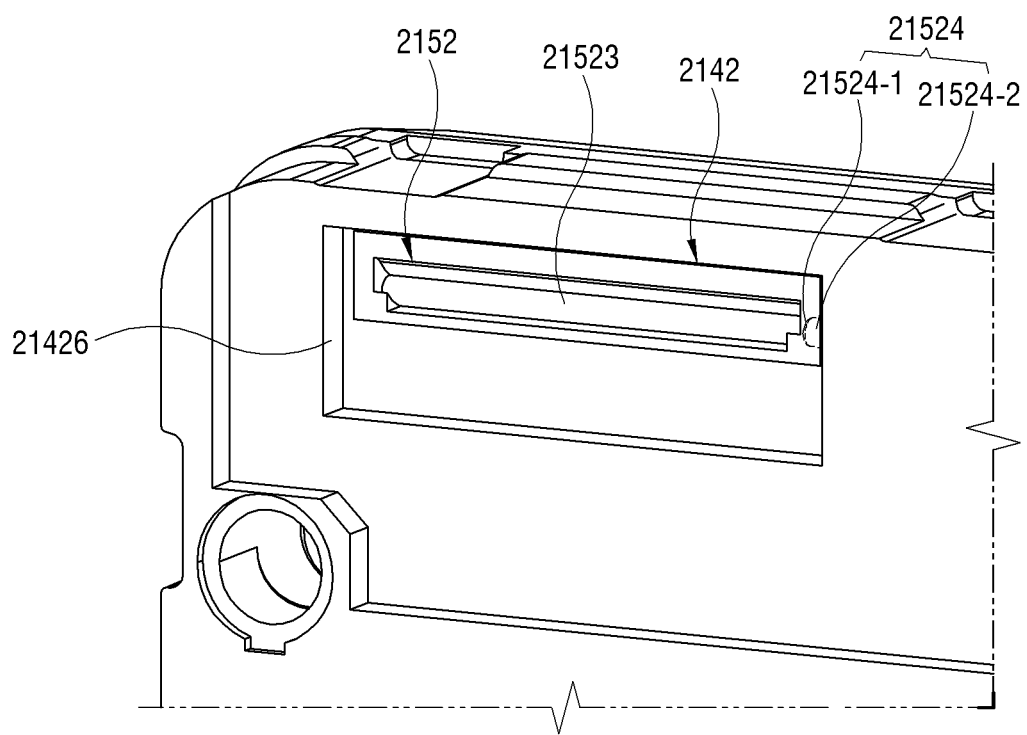
FIG. 21 is a view showing that a damper unit according to an embodiment is disposed in a second channel member.

FIG. 20 is a view showing the off-mode state of the first cold-air control unit 215, and FIG. 21 is a view showing that the damper unit 2152 is disposed in the second channel member 2142.

As shown in FIGS. 20 and 21, the first knob 2153 is moved to an upper right portion of the first knob hole 2172. The five damper units 2152 provided in the first to fifth openings 2151-1 to 2151-3 of the first cold-air control unit 215 are aligned with the first to fifth cold air outlets 213-1 to 213-5 of the mounting cover 217, thereby passing the cold air therethrough as the strength of the cold air can be adjusted according to the functions of the damper units 2152, i.e., in conjunction with the rotating speed of the fan 40. In this case, the stopper 21524 of the damper unit 2152 holds the damper 21523 because the protrusion 21524-2 is inserted in the stopper hole 21524-1 as each the damper unit 2152 is moved rightward. As a result, the damper 21523 blocks the entrance of the variable channel 21521 without interworking with the increasing strength of the cold air, in other words, the increasing rotating speed of the fan 40, so that the freezer compartment 11 can be maintained in the off state.

Figure 22:
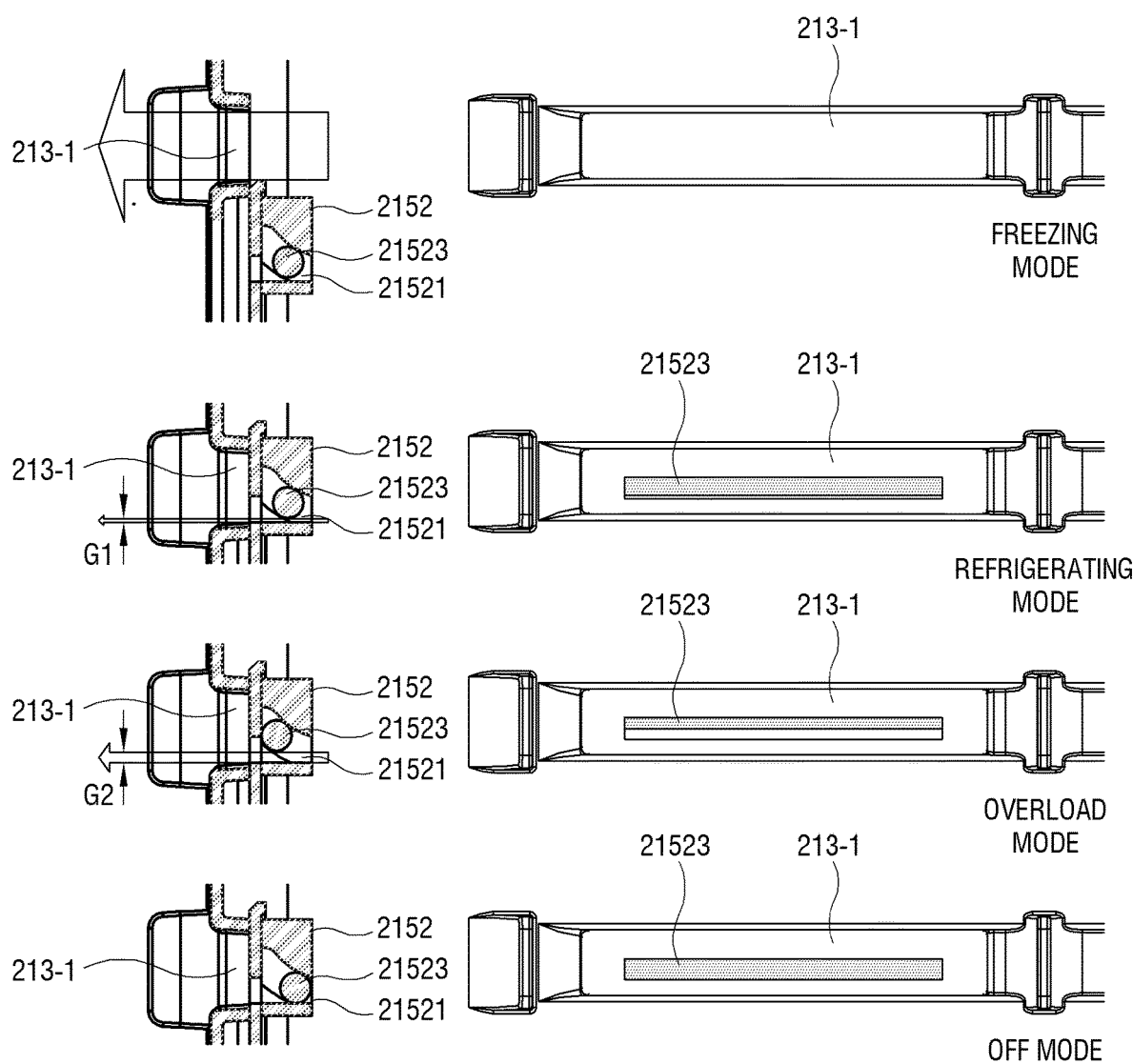
FIG. 22 is a view showing comparison in cold-air discharging mode according to operations of a first cold-air control unit according to an embodiment.

FIG. 22 is a view showing comparison in the cold-air discharging mode according to operations of the first cold-air control unit 215.

As shown in FIG. 22, in the freezing mode, the first cold-air control unit 215 is separated from the first cold air outlet 213-1, and therefore the first cold air outlet 213-1 is completely open.

The refrigerating mode may be divided into a safe operation mode and an overload mode.

In the safe operation mode, the freezer compartment 11 has a constant temperature change and maintains a set refrigerating temperature. In this case, the fan 40 operates to maintain the set refrigerating temperature, and the first cold air outlet 213-1 is opened to a small gap G1 by the damper 21523 of the damper units 2152.

In the overload mode, when it is detected that the temperature of the freezer compartment 11 suddenly rises or the door of the freezer compartment 11 is open, the rotating speed of the fan 40 is increased. In this case, the increasing rotating speed of the fan 40 causes the damper 21523 to move, and thus the first cold air outlet 213-1 is opened to a large gap G2.

In the off mode, the freezer compartment 11 is not used as the freezing or refrigerating mode. In this case, the first cold air outlet 213-1 is completely blocked by the damper 21523. In other words, the damper 21523 is not movable without interworking with the strength of the cold air, in other words, the rotating speed of the fan 40.

Figure 23:
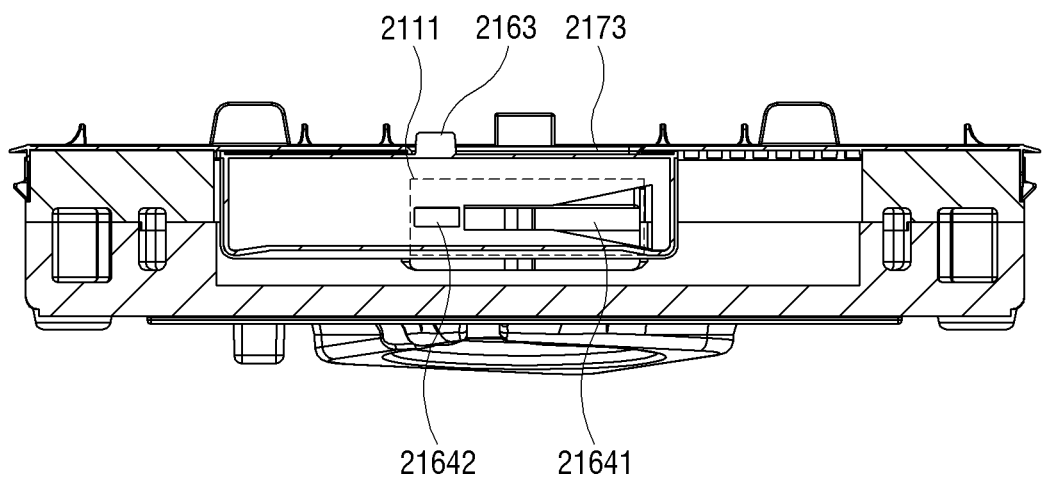
FIG. 23 is a view showing a first-mode state of a second cold-air control unit in the first duct taken along line C-C of FIG. 15.
Figure 24:
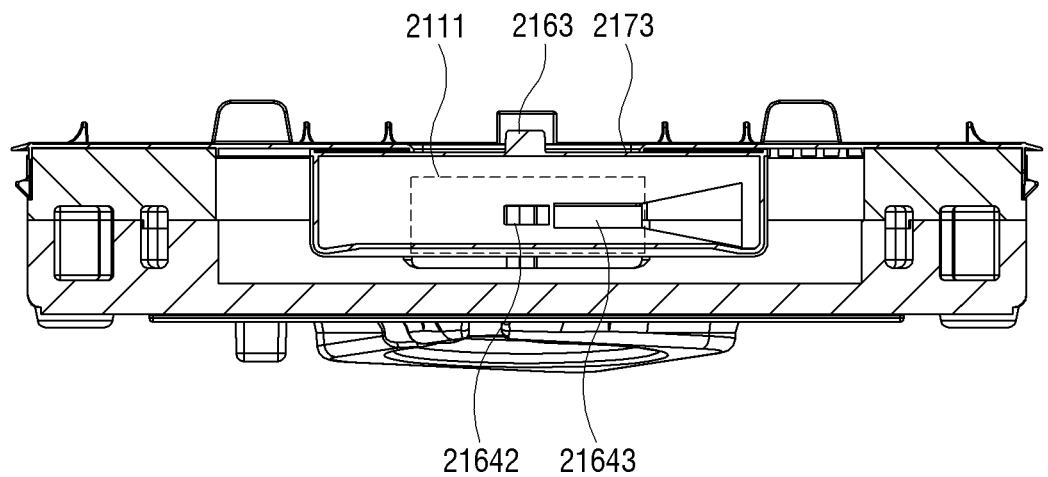
FIG. 24 is a view showing a second-mode state of a second cold-air control unit.
Figure 25:
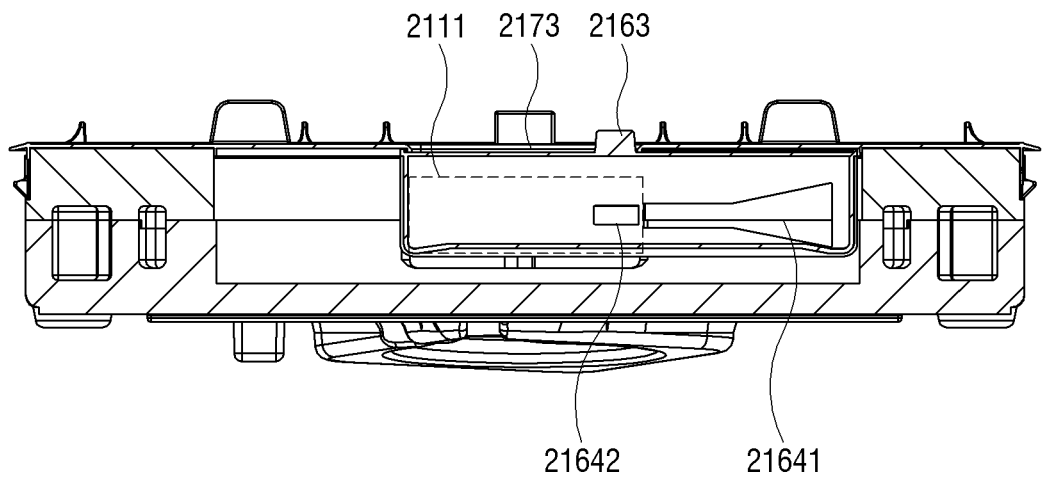
FIG. 25 is a view showing a third-mode state of a second cold-air control unit according to an embodiment.

FIG. 23 is a view showing a first-mode state of the second cold-air control unit 216 in the first duct 21 taken along line C-C of FIG. 15, FIG. 24 is a view showing a second-mode state of the second cold-air control unit 216, and FIG. 25 is a view showing a third-mode state of a second cold-air control unit 216.

As shown in FIG. 23, in the first mode of the second cold-air control unit 216, the second knob 2163 may be located at a left side of the second knob hole 2173. In this case, the main cold-air through hole 21641 and the sub cold-air through hole 21642 of the second cold-air control unit 216 are generally located inside the connection channel 2111, so that the cold air can be normally introduced into the refrigerator compartment 12 through the second duct 23.

As shown in FIG. 24, in the second mode of the second cold-air control unit 216, the second knob 2163 may be located in the middle of the second knob hole 2173. In this case, the linear extending portion 21643 and the sub cold-air through hole 21642 of the main cold-air through hole 21641 of the second cold-air control unit 216 are located inside the connection channel 2111, so that a partially limited amount of cold air can be introduced into the refrigerator compartment 12 through the second duct 23.

As shown in FIG. 25, in the third mode of the second cold-air control unit 216, the second knob 2163 may be located at a right side of the second knob hole 2173. In this case, only the sub cold-air through hole 21642 of the second cold-air control unit 216 is located inside the connection channel 2111, so that a very small amount of cold air can be introduced into the refrigerator compartment 12 through the second duct 23.

Figure 26:
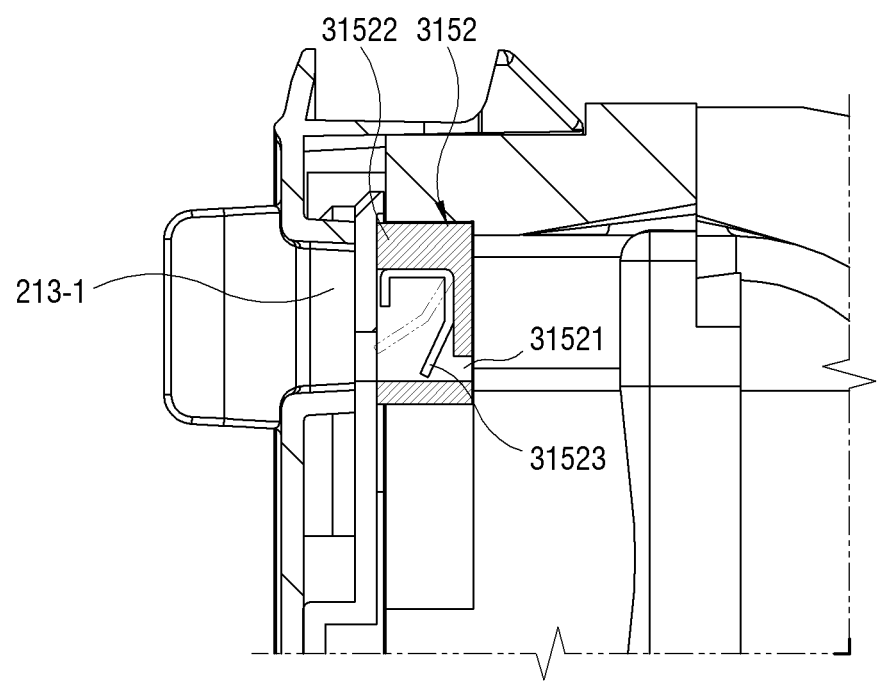
FIG. 26 is a cross-sectional view of a damper unit according to another embodiment.

FIG. 26 is a cross-sectional view of a damper unit 3152 according to another embodiment.

As shown in FIG. 26, the damper unit 3152 may be provided with a leaf spring 31523 in a variable channel 31521 inside a housing 31522. The leaf spring 31523 may be elastically transformed in a flowing direction of cold air. The elastically transformed degree of the leaf spring 31523 may be varied depending on the strength of the cold air flowing in the variable channel 31521, i.e., the rotating speed of the fan 40.

Figure 27:
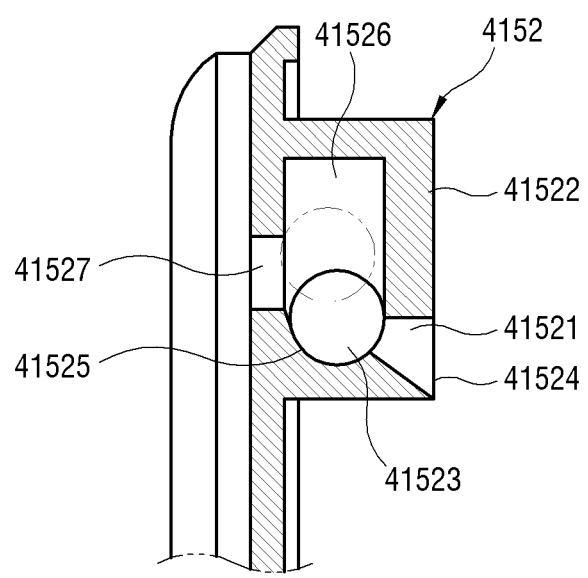
FIG. 27 is a cross-sectional view of a damper unit according to still another embodiment.

FIG. 27 is a cross-sectional view of a damper unit 4152 according to still another embodiment.

The damper unit 4152 may include a variable channel 41521 inside a housing 41522. The variable channel 41521 may include an inlet 41524 into which cold air is introduced, a seating portion 41525 communicating with the inlet 41524 and seating a damper 41523 thereon, a damper evacuating portion 41526 extending upward from the seating portion 41525, and an outlet 41527 from which the cold air is discharged. In the state that the damper 41523 is seated on the seating portion 41525, the inlet 41524 into which the cold air is introduced may be blocked. The inlet 41524 is located below the seating portion 41525. The damper 41523 may easily float in the damper evacuating portion 41526 due to air pressure. As the damper 41523 floats from the seating portion 41525 along the damper evacuating portion 41526, a gap may be formed between the inlet 41524 and the outlet 41527.

According to an embodiment, the cold-air control unit 215 may be applied to a refrigerator 1 having a single storage compartment. In this case, the storage compartment may be used in one of the freezing mode, the refrigerating mode or the off mode as the cold-air control unit 215 operates.

Further, the cold-air control unit 215 according to an embodiment may be applied to a refrigerator 1 having the freezer compartment and the refrigerator compartment. In this case, the freezer compartment may be switched to the storage compartment or turned off, or the refrigerator compartment may be switched to the freezer compartment or turned off, as the cold-air control unit 215 operates.

Although a few exemplary embodiments have been described in detail, the disclosure is not limited thereto and may be variously implemented without departing from the scope of the appended claims.

What is claimed is:

1. A refrigerator comprising:
a storage compartment;
an evaporator configured to generate cold air through heat exchange;
a duct comprising:
a channel formed therein and through which the generated cold air flows; and
a cold air outlet through which the cold air is discharged to the storage compartment;
a fan configured to supply the generated cold air to the storage compartment through the channel; and
a cold-air control unit provided in the channel and configure to control a discharging amount of cold air discharged through the cold air outlet, the cold-air control unit comprising:
a damper movable according to a strength of the generated cold air supplied by the fan to adjust the discharging amount of the generated cold air discharged through the cold air outlet; and
a housing comprising a variable channel to accommodate the damper to be movable therein and to communicate with the channel.

2. The refrigerator of claim 1, wherein the storage compartment comprises a first storage compartment and a second storage compartment, and the cold-air control unit is configured to adjust the discharging amount of the generated cold air to the first storage compartment according to a selected mode of the refrigerator.

3. The refrigerator of claim 1, wherein the variable channel comprises a damper evacuating portion, the damper evacuating portion having an upper inner wall formed therein and is extended along a flowing direction of the generated cold air in the variable channel.

4. The refrigerator of claim 3, wherein a gap between the damper and the inner wall of the variable channel increases as the damper moves to the damper evacuating portion.

5. The refrigerator of claim 4, wherein the damper has a cylindrical shape.

6. The refrigerator of claim 5, wherein
the damper is disposed transversely to an extended direction of the variable channel, and
the variable channel comprises a damper guide to support opposite ends of the damper and to guide the damper to move to the damper evacuating portion.

7. The refrigerator of claim 1, wherein the cold-air control unit comprises a stopper to prevent the damper from moving in the variable channel.

8. The refrigerator of claim 1, wherein the damper comprises a leaf spring elastically transformable along a flowing direction of the cold air.

9. The refrigerator of claim 1, wherein the cold-air control unit operates in a freezing mode where a cold air discharging port is fully open, a refrigerating mode where the cold air discharging port is partially open, and an off mode where the cold air discharging port is blocked.

10. The refrigerator of claim 9, wherein the cold-air control unit is exposed to an inside of the storage compartment, the cold-air control unit comprises a knob to select the freezing mode, the refrigerating mode, and the off mode.

11. The refrigerator of claim 2, wherein the channel comprises a connection channel to supply the cold air to the second storage compartment.

12. The refrigerator of claim 11, wherein the cold-air control unit is a first cold-air control unit, the refrigerator further comprises a second cold-air control unit provided in the connection channel.

13. The refrigerator of claim 12, wherein the second cold-air control unit is exposed to an inside of the storage compartment, the second cold-air comprises a second knob to control the amount of cold air flowing in the connection channel.

* * * * *